US012675528B2

(12) United States Patent
Gupta et al.

(10) Patent No.: US 12,675,528 B2
(45) Date of Patent: Jul. 7, 2026

(54) PERSONALIZED INPUT SUGGESTIONS FOR QUERY INTERFACES

(71) Applicant: Microsoft Technology Licensing, LLC, Redmond, WA (US)

(72) Inventors: Prakul Gupta, Bellevue, WA (US); Rohit Sharma, Issaquah, WA (US); Kishore Seralathan, Bothell, WA (US); Jhon Stewar Rayo Mosquera, Bogota (CO); Soohoon Cho, Lynnwood, WA (US); Gilbert Wong, Bellevue, WA (US); Kailun Qian, Redmond, WA (US); Chao Li, Bellevue, WA (US); Lucas Brito Silva, Fomiga (BR); Anick Saha, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 150 days.

(21) Appl. No.: 18/594,973

(22) Filed: Mar. 4, 2024

(65) Prior Publication Data

US 2025/0278433 A1 Sep. 4, 2025

(51) Int. Cl.
G06F 16/90 (2019.01)
G06F 16/2457 (2019.01)
G06F 16/9032 (2019.01)

(52) U.S. Cl.
CPC .... G06F 16/90328 (2019.01); G06F 16/2457 (2019.01)

(58) Field of Classification Search
CPC ...................... G06F 16/90328; G06F 16/2457
See application file for complete search history.

(56) References Cited

U.S. PATENT DOCUMENTS

| | | | |
|---|---|---|---|
| 12,164,868 B2 * | 12/2024 | Tunstall-Pedoe ... | G06F 16/3344 |
| 12,505,148 B2 * | 12/2025 | Hintz ..................... | G06F 16/383 |
| 12,554,940 B2 * | 2/2026 | Maurer ................... | G06F 40/40 |
| 2024/0273793 A1 * | 8/2024 | DeCharms ............ | G06F 40/197 |
| 2024/0354503 A1 * | 10/2024 | Baruch ................. | G06F 16/345 |
| 2025/0045848 A1 * | 2/2025 | Focke .................. | G06Q 10/103 |
| 2025/0063083 A1 * | 2/2025 | Grinberg .......... | G06Q 10/06393 |
| 2025/0103621 A1 * | 3/2025 | Pan ..................... | G06F 16/3323 |
| 2025/0139472 A1 * | 5/2025 | Ephrath ................ | G06N 20/00 |

* cited by examiner

*Primary Examiner* — Merilyn P Nguyen

(57) ABSTRACT

Systems and methods for generating personalized input suggestions for query interfaces are described. The query interfaces can include chat interfaces (such as chatbot interfaces) and web browsers, for example. In some cases, the system generates personalized input suggestions for a particular user by identifying a set of files that are predicted to be relevant to the user and providing information about each of the files in a prompt to an artificial intelligence (AI) model. The AI model generates a response based on the prompt, and the system surfaces the response in a query interface as an input suggestion. In some cases, the system generates personalized input suggestions (e.g., using an AI model) for a particular user based on the user's search history and classifies each of the generated input suggestions with a label. The system selects input suggestions for surfacing in a query interface based on the label.

20 Claims, 12 Drawing Sheets

400

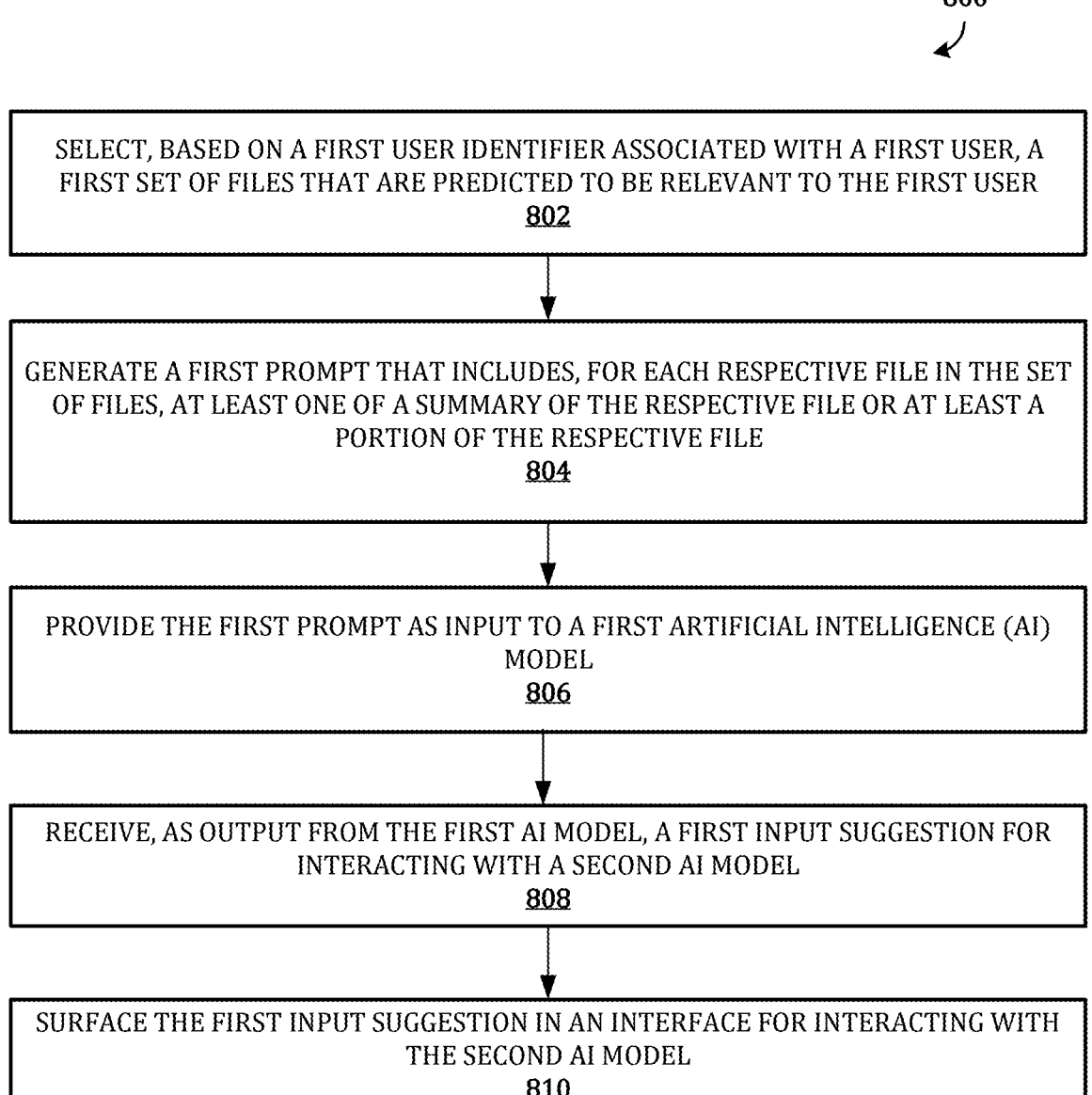

800

SELECT, BASED ON A FIRST USER IDENTIFIER ASSOCIATED WITH A FIRST USER, A FIRST SET OF FILES THAT ARE PREDICTED TO BE RELEVANT TO THE FIRST USER
802

GENERATE A FIRST PROMPT THAT INCLUDES, FOR EACH RESPECTIVE FILE IN THE SET OF FILES, AT LEAST ONE OF A SUMMARY OF THE RESPECTIVE FILE OR AT LEAST A PORTION OF THE RESPECTIVE FILE
804

PROVIDE THE FIRST PROMPT AS INPUT TO A FIRST ARTIFICIAL INTELLIGENCE (AI) MODEL
806

RECEIVE, AS OUTPUT FROM THE FIRST AI MODEL, A FIRST INPUT SUGGESTION FOR INTERACTING WITH A SECOND AI MODEL
808

SURFACE THE FIRST INPUT SUGGESTION IN AN INTERFACE FOR INTERACTING WITH THE SECOND AI MODEL
810

Figure 9:
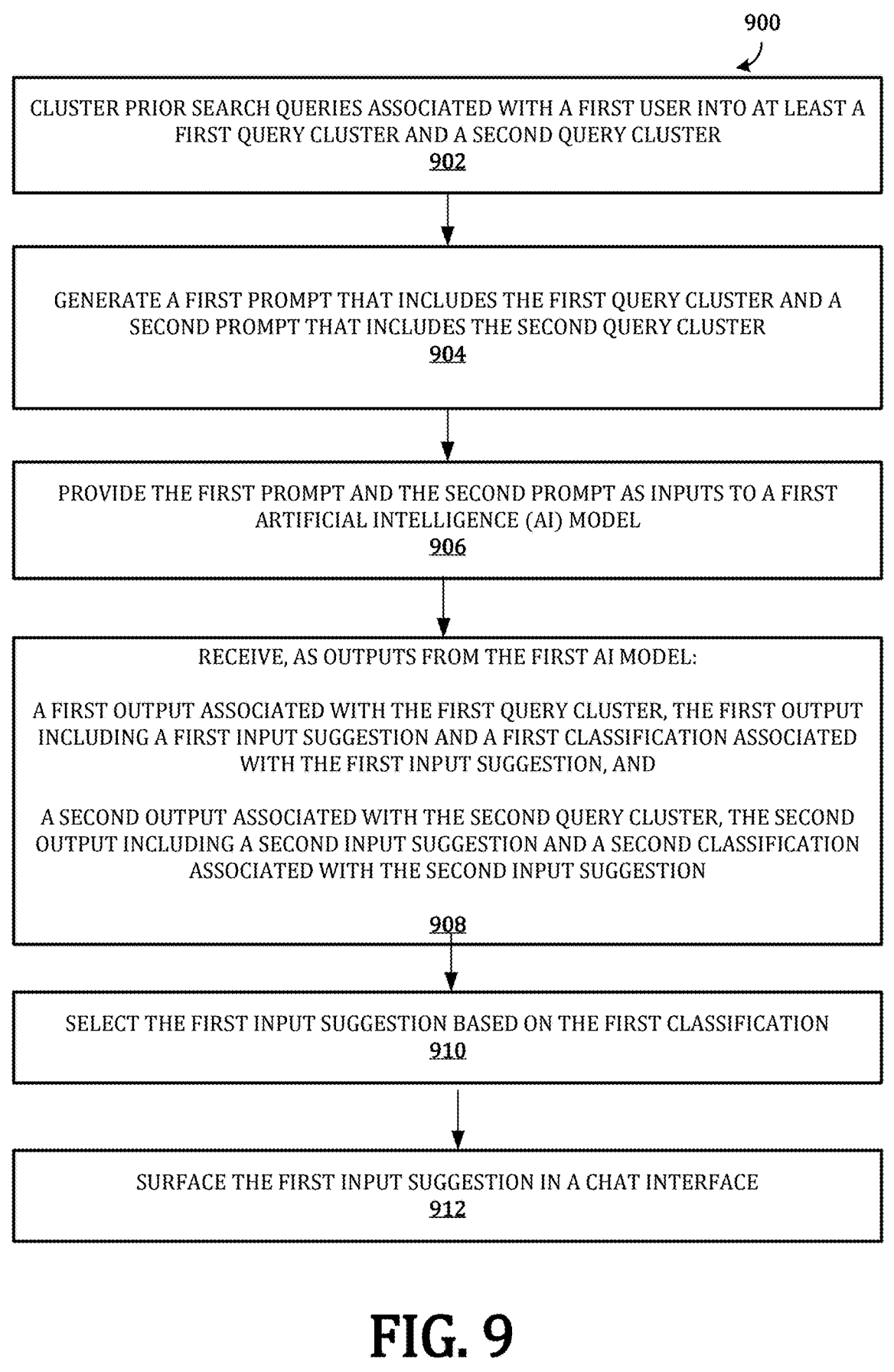

CLUSTER PRIOR SEARCH QUERIES ASSOCIATED WITH A FIRST USER INTO AT LEAST A FIRST QUERY CLUSTER AND A SECOND QUERY CLUSTER
902

GENERATE A FIRST PROMPT THAT INCLUDES THE FIRST QUERY CLUSTER AND A SECOND PROMPT THAT INCLUDES THE SECOND QUERY CLUSTER
904

PROVIDE THE FIRST PROMPT AND THE SECOND PROMPT AS INPUTS TO A FIRST ARTIFICIAL INTELLIGENCE (AI) MODEL
906

RECEIVE, AS OUTPUTS FROM THE FIRST AI MODEL:

A FIRST OUTPUT ASSOCIATED WITH THE FIRST QUERY CLUSTER, THE FIRST OUTPUT INCLUDING A FIRST INPUT SUGGESTION AND A FIRST CLASSIFICATION ASSOCIATED WITH THE FIRST INPUT SUGGESTION, AND

A SECOND OUTPUT ASSOCIATED WITH THE SECOND QUERY CLUSTER, THE SECOND OUTPUT INCLUDING A SECOND INPUT SUGGESTION AND A SECOND CLASSIFICATION ASSOCIATED WITH THE SECOND INPUT SUGGESTION

908

SELECT THE FIRST INPUT SUGGESTION BASED ON THE FIRST CLASSIFICATION
910

SURFACE THE FIRST INPUT SUGGESTION IN A CHAT INTERFACE
912

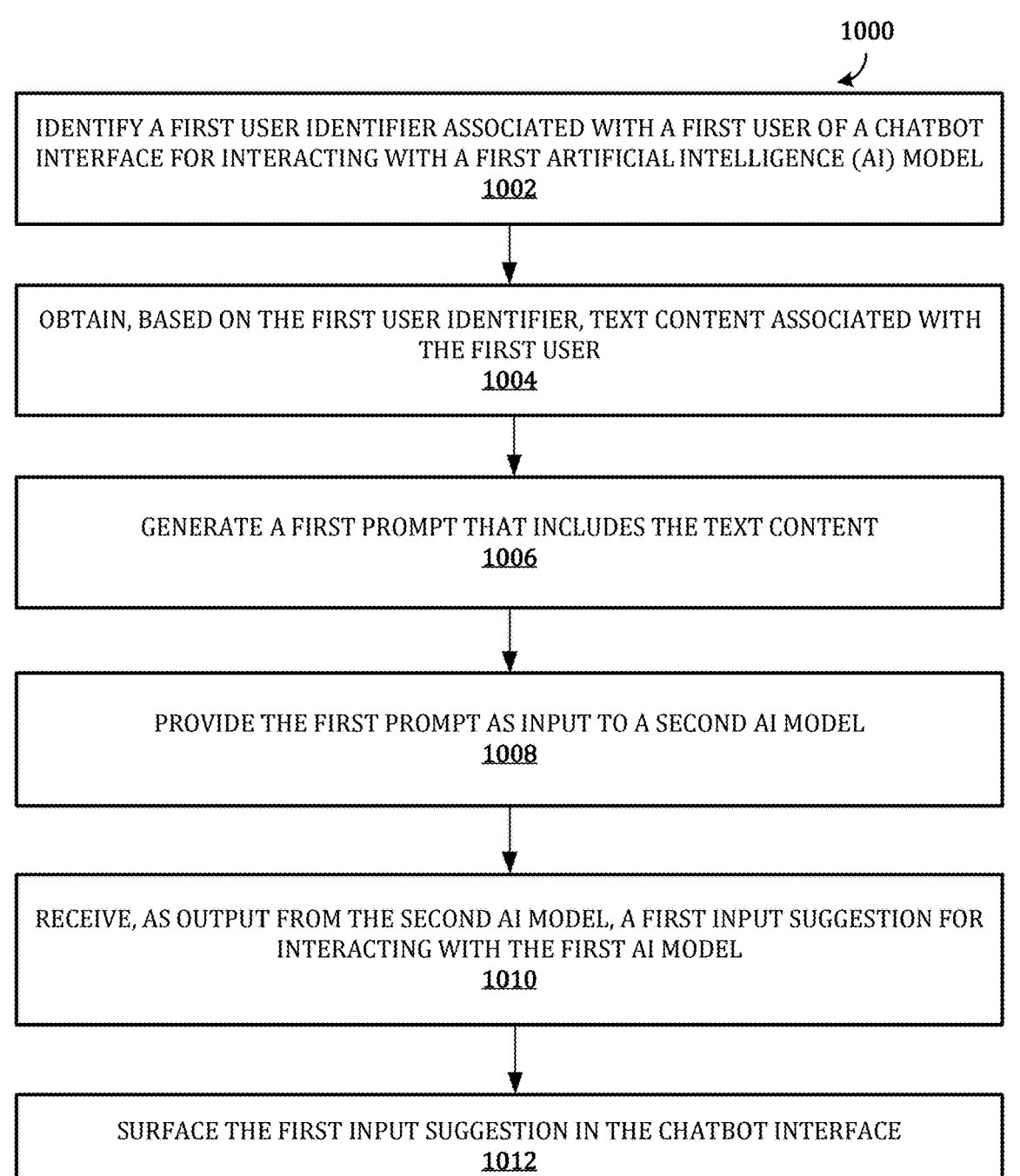

IDENTIFY A FIRST USER IDENTIFIER ASSOCIATED WITH A FIRST USER OF A CHATBOT INTERFACE FOR INTERACTING WITH A FIRST ARTIFICIAL INTELLIGENCE (AI) MODEL
1002

OBTAIN, BASED ON THE FIRST USER IDENTIFIER, TEXT CONTENT ASSOCIATED WITH THE FIRST USER
1004

GENERATE A FIRST PROMPT THAT INCLUDES THE TEXT CONTENT
1006

PROVIDE THE FIRST PROMPT AS INPUT TO A SECOND AI MODEL
1008

RECEIVE, AS OUTPUT FROM THE SECOND AI MODEL, A FIRST INPUT SUGGESTION FOR INTERACTING WITH THE FIRST AI MODEL
1010

SURFACE THE FIRST INPUT SUGGESTION IN THE CHATBOT INTERFACE
1012

FIG. 10

PERSONALIZED INPUT SUGGESTIONS FOR QUERY INTERFACES

BACKGROUND

Generative artificial intelligence (AI) models can be used to automatically generate responses to natural language queries that are input by human users (e.g., queries that are input via a chatbot interface or another chat interface). Some chatbot interfaces display suggested queries for the chatbot.

It is with respect to these and other considerations that examples have been made. In addition, although relatively specific problems have been discussed, it should be understood that the examples should not be limited to solving the specific problems identified in the background.

SUMMARY

Examples described in this disclosure relate to systems and methods for generating personalized input suggestions for query interfaces, such as chat interfaces and/or search interfaces. In one example, the system selects files that are predicted to be relevant to a user of the query interface and generates a prompt that includes summaries of the files and/or excerpts from the files. The prompt is provided as input to an artificial intelligence (AI) model, and an input suggestion (e.g., a suggested query) is received as output from the AI model. The input suggestion is surfaced in the query interface.

In another example, previous search queries associated with a user of the query interface are clustered into query clusters (e.g., clusters of semantically related search queries). The previous search queries may be queries that were previously entered (e.g., by the user) in a web browser or search engine, for example. The query clusters are classified with a label based on the semantic content of the query clusters. For example, the query clusters may be classified as "work related" or "non work related" depending on the content of the queries. The system generates a prompt that includes a first query cluster and provides the prompt as input to an AI model. A first input suggestion is received as output from the AI model and stored with the label associated with the first query cluster, along with other labeled input suggestions corresponding to other query clusters. The system selects the first input suggestion based on the associated label and/or based on the type of query interface in which the input suggestion will be surfaced (e.g., based on whether the query interface is a work-related query interface or a non-work-related query interface). The system surfaces the input suggestion in the query interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

FIG. 8 depicts an example method for generating personalized input suggestions for query interfaces.

FIG. 9 depicts an example method for generating personalized input suggestions for query interfaces.

FIG. 10 depicts an example method for generating personalized input suggestions for query interfaces.

DETAILED DESCRIPTION

Figure 1:
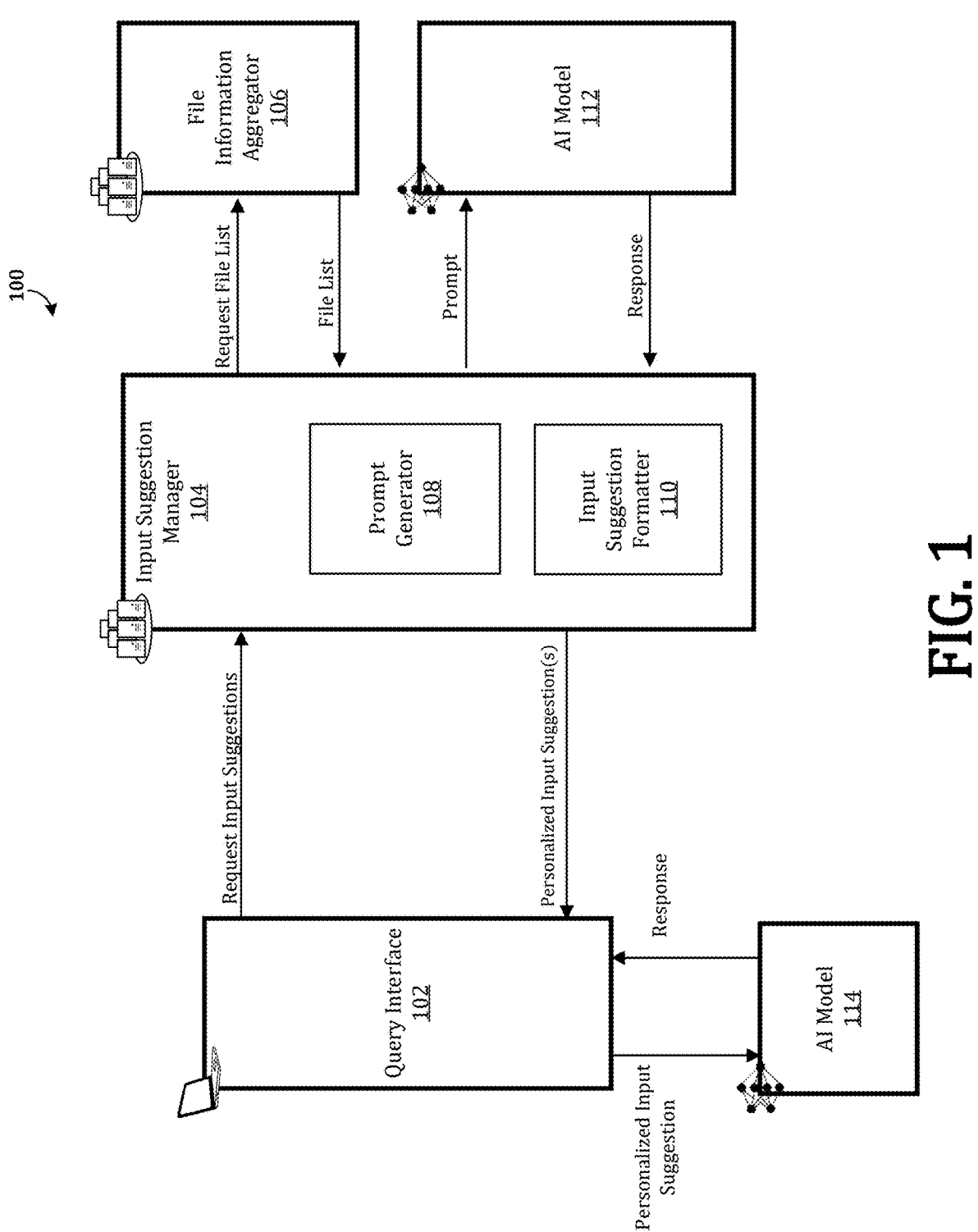
FIG. 1 is a block diagram of an example system for generating personalized input suggestions for query interfaces.

Examples described in this disclosure relate to systems and methods for generating personalized input suggestions for query interfaces. Chat interfaces typically receive natural-language input queries and surface (e.g., display or present) responses that are provided by a human (in a live chat session) or by an artificial intelligence (AI) model (in a chatbot session). Similarly, search interfaces, such as web search interfaces or file search interfaces, typically receive a search string as input and surface a list of websites, documents, or other types of results as a response.

Some chat interfaces provide suggested queries (e.g., input suggestions) that a user can select in order to provide the query to the chat interface (e.g., to interact with a chatbot AI model using a suggested query). Such suggested queries are typically user-agnostic; the same generic suggestions are provided to different users.

As described herein, a system including a query interface (e.g., a chat interface or search interface configured to receive and respond to user queries) may be configured to display personalized, user-specific input suggestions that are more relevant and useful to the user than generic input suggestions. In some examples, the personalized input suggestions are zero-input queries that are generated and surfaced in the query interface automatically rather than in response to a query that is input by a user, such as before any query input is received from the user.

In some examples, a system generates personalized input suggestions based on aggregated information about electronic files stored on a network server(s). The files may be indicative of recent work or activities performed by a particular user or otherwise directly relevant to the user. For instance, such files may include files that are accessed by a first user (e.g., a user of a query interface) and/or by other users associated with the first user. The other users may be teammates or colleagues of the first user, such as other users that are assigned to the same project as the first user, are included in the same email distribution list as the first user, are invited to the same meeting as the first user, and/or can otherwise be determined, by the system, to be associated with the first user. In some examples, the server(s) is associated with a particular entity, such as a company or government organization, and/or may contain files that are not publicly accessible.

The aggregated file information may include information about files (e.g., text files, presentation files, graphics files, media files, calendar files, or information about other types of files that may be stored on a server(s)). Calendar files may include files or data associated with a calendar application that include information about scheduled meetings or events, documents attached to calendar events, information about the event host and/or invitees. The information about each file may include a file name, a timestamp (e.g., a date and time) at which the file was created, edited, or viewed, or otherwise accessed; a user identifier(s) associated with a user(s) who has accessed the file; a summary of the file contents; and/or other information about the file.

The system determines a user identifier associated with a user of the query interface, such as user ID, a username, email address, a phone number, or other form of identifier of a user that has launched the query interface, has logged in to the query interface, and/or is interacting with the query interface. The system selects, based on the user identifier and based on the file information, a set of files that are predicted, by the system, to be relevant to the user. For example, the system may predict that a particular file will be relevant to the user based on information indicating the user is associated with the file (e.g., the user is an invitee of a calendar file corresponding to a meeting), information indicating that the user has recently accessed the file, and/or information indicating that other users associated with the user have recently accessed the file.

After selecting the set of files that are predicted to be relevant to the user, the system generates an AI prompt that includes a summary of each of the selected files and/or at least a portion of each of the selected files. The system provides the prompt to an AI model and receives, as output from the AI model, one or more personalized input suggestions (e.g., input suggestions that are personalized for the user due to being generated based on files that are predicted to be relevant to the user). The system surfaces the input suggestion(s) to the user in the query interface. The user can then select one of the surfaced input suggestions to provide the input suggestion to the query interface as an input (e.g., to query a chatbot).

Additionally or alternatively, in some examples, a system generates personalized input suggestions for a user of a chat interface based on previous search queries that the user entered into a different query interface, such as a web browser or search engine. The system stores a database of previous search queries (e.g., a query history) associated with the user that have been entered into a web browser and/or search engine. In some examples, the system detects an identifier associated with the user of the chat interface and obtains previous search queries for that user (e.g., based on the identifier). The identifier may be a user ID, email address of the user, a username of the user, an IP address of the user's computing device, or another type of identifier that can be used to identify previous search queries for the user.

The system groups semantically related previous search queries for the user into query clusters. The query clusters are then used to generate input suggestions. In addition, the query clustered may be classified (e.g., labeled) based on the semantic content of the query cluster. For example, the system may label a query cluster as "work related," "non work related," "school related," "sports related," or using another label. Classification of the query clusters and the generation of the input suggestions may be performed concurrently through the use of an AI model. For instance, an AI prompt may be generated that includes the query clusters and static instructions that instruct the AI model to generate the input suggestion and also classify the query cluster and/or generated input suggestion.

In other examples, the classification operations and generation of the input suggestion may be performed in separate operations. In some examples, the system uses a machine-learning classifier model to classify (label) the query clusters. After classifying the query clusters, the system provides each query cluster to an AI model as input and receives a corresponding input suggestion as output from the AI model. Thus, the system generates, using an AI model, an input suggestion for each query cluster, where each input suggestion is associated with a corresponding label (e.g., the label of the query cluster used to generate the input suggestion).

The system selects one or more of the input suggestions for surfacing in the chat interface based on the corresponding label, such as by selecting the input suggestion(s) based on a type of chat interface or application in which the input suggestion will be surfaced. For instance, for a first type of application (e.g., a work-related chat interface), the system selects input suggestion(s) having a first type of classification label (e.g., work-related). For a second type of application (e.g., non-work-related chat interface), the system selects input suggestion(s) having a second type of classification label (e.g., non-work related).

By creating the input suggestions by the processes discussed herein, the utilization of the generative AI model and the results produced by the generative AI models are improved. For instance, by generating the input suggestions from the recent files of the user or the user's team, the underlying data that may be leveraged to generate a generative AI response can be surfaced such that they are relevant specifically to the user and recent activities. Execution of the input suggestion, rather than other non-suggested inputs, are therefore more likely to produce relevant, accurate results that prevent or reduce the number of subsequent follow-up or revision inputs that need to be processed by the generative AI model. Such reduction in subsequent inputs further reduces the computing resources that would be required to process such subsequent prompts. Similarly, use of the prior web search queries to generate input suggestions for a non-web search interface, such as an AI-based chat interface, provides for leveraging data from a first modality or application for use with a different, less familiar second modality, such as the AI-based chat interface. In addition, the clustering and classification of the prior web search queries allow for more accurate input suggestions to be surfaced in the right application type. For instance, input suggestions of a first classification are no longer surfaced in application types where the first classification is less likely to be entered or, if entered, would lead to potentially inaccurate results.

Additional details regarding personalized input suggestions for query interfaces are discussed with reference to FIGS. 1-10.

Figure 11:
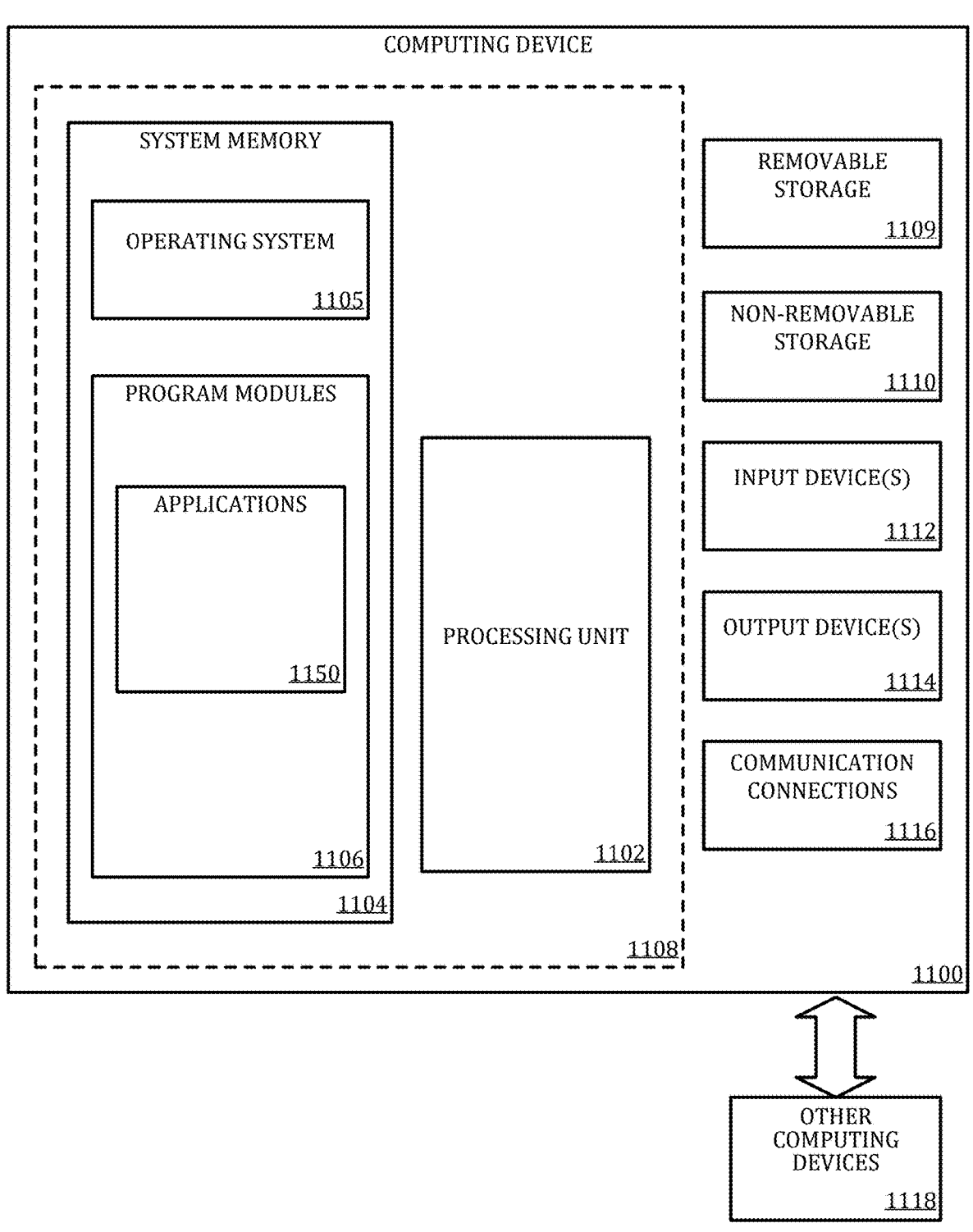
FIG. 11 is a block diagram illustrating example physical components of a computing device with which aspects of the disclosure may be practiced.

FIG. 1 is a block diagram of a system 100 for generating personalized input suggestions for query interfaces in accordance with an example. The system 100, as depicted, is a combination of interdependent components that interact to form an integrated whole. Some components of the system are illustrative of software applications, systems, or modules that operate on a computing device or across a plurality of computer devices. Any suitable computer device(s) may be used, including web servers, application servers, network appliances, dedicated computer hardware devices, virtual server devices, personal computers, a system-on-a-chip (SOC), or any combination of these and/or other computing devices known in the art. In one example, components of systems disclosed herein are implemented on a single processing device. The processing device may provide an operating environment for software components to execute and utilize resources or facilities of such a system. An example of processing device(s) comprising such an operating environment is depicted in FIG. 11. In another example, the components of systems disclosed herein are distributed across multiple processing devices. For instance, an input query (e.g., a personalized input suggestion) may be displayed and/or entered on a user device or client device and information may be processed on or accessed from other devices in a network, such as one or more remote cloud devices or web server devices.

According to an aspect, the system 100 includes a query interface 102. The query interface 102 includes a user interface such as a graphical user interface, a speech recognition interface, or another type of human-machine interface that is configured to receive an input query from a user and output (e.g., surface) a response to the query (e.g., by displaying the response, speaking the response, or otherwise providing the response). The query interface 102 may be a chat interface or a search interface, such as a web browser, search engine, or file search interface. The term "query interface" may refer to both a graphical user interface and an application with which the user interface is associated.

An input query provided to the query interface 102 can include a request for information, a prompt, or a question, for example. In some examples, the input query is a natural language query. In some examples, the input query is a text string that includes one or more keywords for searching. The response to the query that is surfaced by the query interface 102 may be in the form of a natural language response (for a chat interface) or a list of files or websites (for a search interface).

The query interface 102 is presented and/or executed by a computing device that may take a variety of forms, including, for example, a desktop computer, laptop, tablet, smart phone, wearable device, gaming device/platform, virtualized reality device/platform (e.g., virtual reality (VR), augmented reality (AR), mixed reality (MR)), etc.

In some examples, the query interface 102 is presented in response to detecting a request to launch the query interface 102, such as a request to launch a chat interface, a web browser, or a file search interface. The request to launch the query interface 102 may be received, for example, as a user input requesting to launch the query interface 102 or as a request to launch the query interface 102 from an operating system of the computing device (such as during start-up of the computing device).

To enable generation of personalized (user-specific) input suggestions, the query interface 102 determines an identifier associated with a user of the query interface 102. The identifier may be a username of the user, an email address of the user, an IP address of the computing device on which the query interface 102 is presented, or another type of identifier. In some examples, the query interface 102 determines the identifier of the user based on login information of the user.

The query interface 102 is configured to request personalized input suggestions in response to detecting a trigger. For example, the query interface 102 may request a personalized input suggestion(s) in response to detecting the launch of the query interface 102, in response to detecting that the query interface 102 has transitioned from an inactive state to an active state (e.g., the user has interacted with the query interface 102, such as by clicking on the query interface 102), in response to detecting that a user has logged in to the query interface 102, in response to detecting a refresh (e.g., reload) of a GUI of the query interface 102, and/or in response to another trigger indicating that a input suggestion should be surfaced.

In response to detecting the trigger, the query interface 102 sends a request for input suggestions to an input suggestion manager 104. The request for input suggestions may include the user identifier.

In response to receiving the request for input suggestions, the input suggestion manager 104 sends a request for a list of files to a file information aggregator 106. In some examples, the request for a list of files includes the user identifier. The file information aggregator 106 monitors and aggregates information about interactions between users and files. Such files can include text-based documents, image files, video files, audio files, meeting files (e.g., calendared meetings and documents attached to or otherwise associated with the meeting), or any other type of file that can be created and stored on a server. For example, the file information aggregator 106 monitors and stores file information including: identifiers of users that have accessed a particular file (e.g., by creating, saving, sending, viewing, and/or editing the file); timestamps at which a file was accessed and corresponding identifiers of the users who accessed the file at that timestamp; and/or summaries of files (e.g., summaries of the semantic content of files). The summaries may include portions of text content in the file, file metadata (such as an identifier associated with the author, the file length, or other types of metadata), and/or content that is generated based on the file content (such as by a semantic analysis of the file) but is not included in the file itself. For example, the file information aggregator may include file information about upcoming meetings, meeting invitees, and/or documents attached to the meetings.

In response to receiving the request for the list of files, the file information aggregator 106 selects one or more files that are predicted to be relevant to the user based on the user identifier and the file information. For example, the system may predict that a particular file will be relevant to the user based on information indicating that the user or another user(s) associated with the user has recently accessed the file, based on a similarity of the file to other files the user has recently accessed (e.g., similarity in terms of the file name, the users who have accessed the file, the semantic content of the summary of the file, the association of the file with a previous or upcoming meeting, or other indicators of similarity), and/or based on other relevance criteria. For example, the system may predict that a file will be relevant to a user based on determining that the file was attached to a calendar meeting for which the first user was an attendee but the first user has not yet accessed the file. For example, the system may predict that a file will be relevant to the first user based on determining that a file associated with a project assigned to the first user was recently created or edited by a project teammate of the first user. It should be appreciated that there are other ways to predict the relevance of a file to a user based on the file information described herein.

In some examples, the file information aggregator 106 sends a list of some or all of the identified files to the input suggestion manager 104. In some examples, the file information aggregator 106 ranks the identified files in terms of their predicted relevance to the user and selects the most-relevant files for inclusion in the list of files. For example, the file information aggregator 106 may determine a relevance value associated with each identified file based on the user identifier and the file information, and select the top 10 (or 5, or 15, or another quantity) of files for inclusion in the list of files. In some examples, the list of files includes the files themselves, summaries of the files, and/or file metadata.

A prompt generator 108 of the input suggestion manager 104 receives the list of files and generates an AI prompt for a first AI model 112, such as a large language model (LLM). An AI prompt may be considered a generated set of instructions, queries, or data input that is provided as input into a generative AI model. The prompt can vary in format and encompass textual data, numerical inputs, audio cues, visual images, or any combination thereof, depending on the LM's design and functionality. The prompt initiates a computational process within the AI model, where the model applies algorithms, such as neural networks, to generate a response or output. The prompt itself may be considered a single object or closed set of data that is provided to the LM.

In an example, the prompt includes some or all of the information included in the list of files (including a summary and/or a portion of the contents of each file) and instructs the first AI model 112 to generate content (such as a text string) for an input suggestion using the information included in the prompt. The prompt generator 108 provides the prompt to the first AI model 112 as an input to the first AI model 112, which generates one or more input suggestions in response to receiving the prompt. In some examples, the first AI model 112 outputs the content for the input suggestion(s) to an input suggestion formatter 110, which parses the output of the first AI model 112 to extract and format the input suggestion(s) contained within the output. The personalized input suggestions are then provided to the query interface 102. In some examples, the content generated by the first AI model 112 is provided as-is to the query interface 102 (e.g., the input suggestion formatter 110 is not included in the input suggestion manager and/or does not alter the input suggestions that are output by the first AI model 112). The query interface 102 receives and surfaces, in the query interface 102, the personalized input suggestion(s) from the input suggestion manager 104.

In some examples, in response to detecting a user input corresponding to a selection of an input suggestion that has been surfaced in the query interface 102, the query interface 102 generates and transmits, to a second AI model 114, an AI prompt that includes the selected input suggestion. The second AI model 114 generates a response to the prompt and provides the response to the query interface 102. The query interface 102 surfaces the response received from the second AI model 114. The second AI model 114 may also be a language model, such as an LLM. In some examples, the second AI model 114 is the same model as the first AI model 112.

In some examples, the first AI model 112 and/or second AI model 114 is a generative AI model that is in the form of a deep neural network that utilizes transformer architectures to process the text received as a prompt. The neural network may include an input layer, multiple hidden layers, and an output layer. The hidden layers typically include attention mechanisms that allow the language model to focus on specific parts of the input text, and to generate context-aware outputs. The language model is generally trained using supervised learning based on large amounts of annotated text data.

The complexity of a language model may be measured by the number of parameters it has. For instance, as one example of an LLM, the GPT-4 model from OpenAI has billions of parameters. These parameters may be weights in the neural network that define its behavior, and a large number of parameters allows the model to capture complex patterns in the training data. The training process typically involves updating these weights using gradient descent algorithms, and is computationally intensive, requiring large amounts of computational resources and a considerable amount of time. The language models in examples herein, however, are pre-trained, meaning that the language models have already been trained on the large amount of data. This pre-training allows the models to have a strong understanding of the structure and meaning of text, which makes them more effective for the specific tasks discussed herein.

The language model may operate as a transformer-type neural network. Such an architecture may employ an encoder-decoder structure and self-attention mechanisms to process the input data (e.g., a prompt). Initial processing of the prompt may include tokenizing the prompt into tokens that may then be mapped to a unique integer or mathematical representation. The integers or mathematical representations combined into vectors that may have a fixed size. These vectors may also be known as embeddings.

The initial layer of the transformer model receives the token embeddings. Each of the subsequent layers in the model may use a self-attention mechanism that allows the model to weigh the importance of each token in relation to every other token in the input. In other words, the self-attention mechanism may compute a score for each token pair, which signifies how much attention should be given to other tokens when encoding a particular token. These scores are then used to create a weighted combination of the input embeddings.

In some examples, each layer of the transformer model comprises two primary sub-layers: the self-attention sub-layer and a feed-forward neural network sub-layer. The self-attention mechanism mentioned above is applied first, followed by the feed-forward neural network. The feed-forward neural network may be the same for each position and apply a simple neural network to each of the attention output vectors. The output of one layer becomes the input to the next. This means that each layer incrementally builds upon the understanding and processing of the data made by the previous layers. The output of the final layer may be processed and passed through a linear layer and a softmax activation function. This outputs a probability distribution over all possible tokens in the model's vocabulary. The token(s) with the highest probability is selected as the output token(s) for the corresponding input token(s).

According to example implementations, the first AI model 112 and/or second AI model 114 is trained to understand and generate sequences of tokens, which may be in the form of natural language (e.g., human-like text). In various examples, the first AI model 112 and/or second AI model 114 can understand complex intent, cause and effect, perform language translation, semantic search classification, complex classification, text sentiment, summarization, summarization for an audience, and/or other natural language capabilities.

In example implementations, the first AI model 112, second AI model 114, input suggestion manager 104, and/or file information aggregator 106 operate on a device (or devices) that is/are located remotely from the computing device associated with (e.g., executing or presenting) the query interface 102. For instance, the computing device may communicate with the first AI model 112, second AI model 114, and/or input suggestion manager 104 using one or a combination of networks (e.g., a private area network (PAN), a local area network (LAN), or a wide area network (WAN)). In some examples, the first AI model 112 and/or second AI model 114 is implemented in a cloud-based environment or server-based environment using one or more cloud resources, such as server devices (e.g., web servers, file servers, application servers, database servers), personal computers (PCs), virtual devices, and mobile devices. The hardware of the cloud resources may be distributed across disparate regions in different geographic locations.

Figures 2A, 2B:
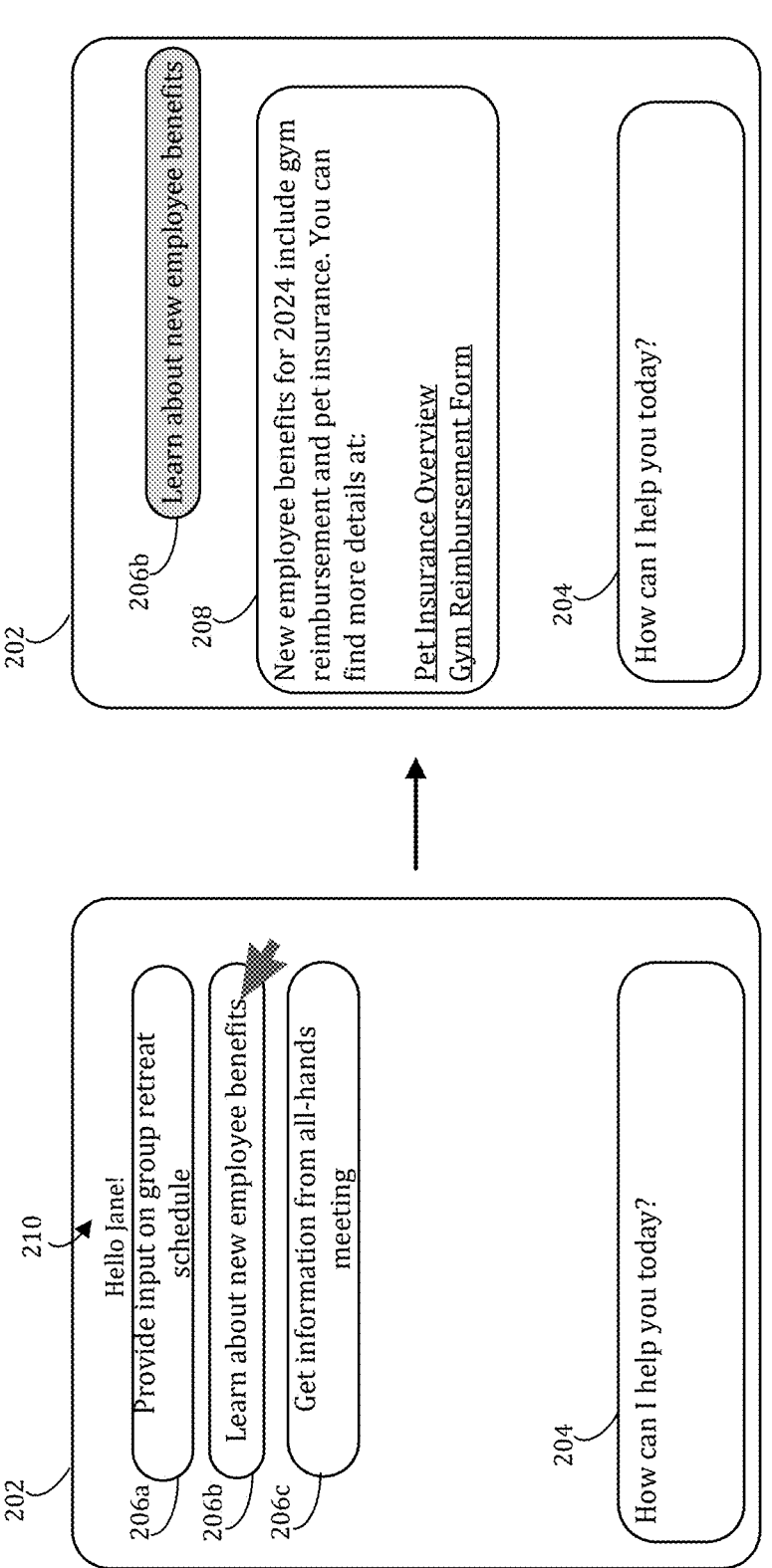
FIGS. 2A-2B depict an example of a query interface that provides personalized input suggestions.

FIGS. 2A-2B depict an example of a query interface that provides personalized input suggestions.

FIG. 2A depicts a chatbot interface 202 for interacting with an AI model. The chatbot interface 202 is configured to receive queries via text input field 204 and respond to such queries using an AI model, such as second AI model 114. For example, a user can input a text sentence in text input field 204, and the chatbot interface 202 generates a prompt that includes the text sentence and provides the prompt to an AI model as input. The chatbot interface 202 receives a response to the prompt, as output from the AI model, and surfaces the response via the chatbot interface 202.

In the example of FIG. 2A, the chatbot interface 202 displays an indication of a user 210 ("Jane") of the chatbot interface 202 (e.g., a user that is logged into the chatbot interface 202, interacting with the chatbot interface 202, and/or otherwise associated with the chatbot interface 202). The chatbot interface 202 also concurrently displays three personalized input suggestions: a first input suggestion 206a, a second input suggestion 206b, and a third input suggestion 206c (which are collectively referred to as input suggestions 206). Such input suggestions 206 are generated as described with reference to FIG. 1 based on a user identifier associated with the user of the chatbot interface 202 (in this example, a user identifier associated with Jane). For example, the input suggestions 206a are generated by identifying files that are predicted to be relevant to Jane (e.g., based on Jane's user identifier and based on aggregated file information), generating a prompt based on the list of files (where the prompt includes summaries and/or excerpts from the files), providing the prompt to the language model, and receiving an output from the language model.

The first input suggestion 206a may be generated, for example, based on file information that indicates that Jane has been invited to a group retreat (e.g., as determined based on a calendar file or based on other file information), file information that indicates that Jane has not yet accessed the group retreat schedule, and/or based on other file information. The second input suggestion 206b may be generated, for example, based on file information that indicates that another user with whom Jane is associated (e.g., a colleague) has recently added or edited files related to employee benefits and/or has hosted a meeting regarding employee benefits. The third input suggestion 206c may be generated, for example, based on file information that indicates that Jane was invited to and/or participated in an all-hands meeting and/or that one or more files were attached to a calendar event for the all-hands meeting. It should be understood that, if a different user were using the chatbot interface 202 (e.g., someone other than Jane), different input suggestions may be generated (and surfaced) based on the user identifier of the different user.

In some examples, the chatbot interface 202 displays the input suggestions 206 based on a trigger, such as when the chatbot interface 202 is initially launched and/or in response to another trigger.

In response to detecting a user input indicating a selection of the second input suggestion 206b, the chatbot interface 202 generates a prompt that includes the second input suggestion 206, provides the prompt to an AI model as input, and receives a response as output from the AI model. The user input indicating a selection of the second input suggestion 206b can include, for example, a touch on a touch screen, a mouse click, or other user input directed to the second input suggestion 206b.

In FIG. 2B, in response to receiving the response 208 as an output from the AI model, the chatbot interface 202 surfaces the response 208 by displaying the response 208 in the chatbot interface 202. In the example of FIG. 2B, the chatbot interface 202 also re-displays the selected second input suggestion 206b with different visual characteristics relative to those depicted in FIG. 2A (e.g., in a different location and with a different background color). In some examples, when the chatbot interface 202 surfaces the response 208, the chatbot interface 202 ceases to display unselected input suggestions (e.g., the first input suggestion 206a and the third input suggestion 206c).

Figures 3A, 3B:
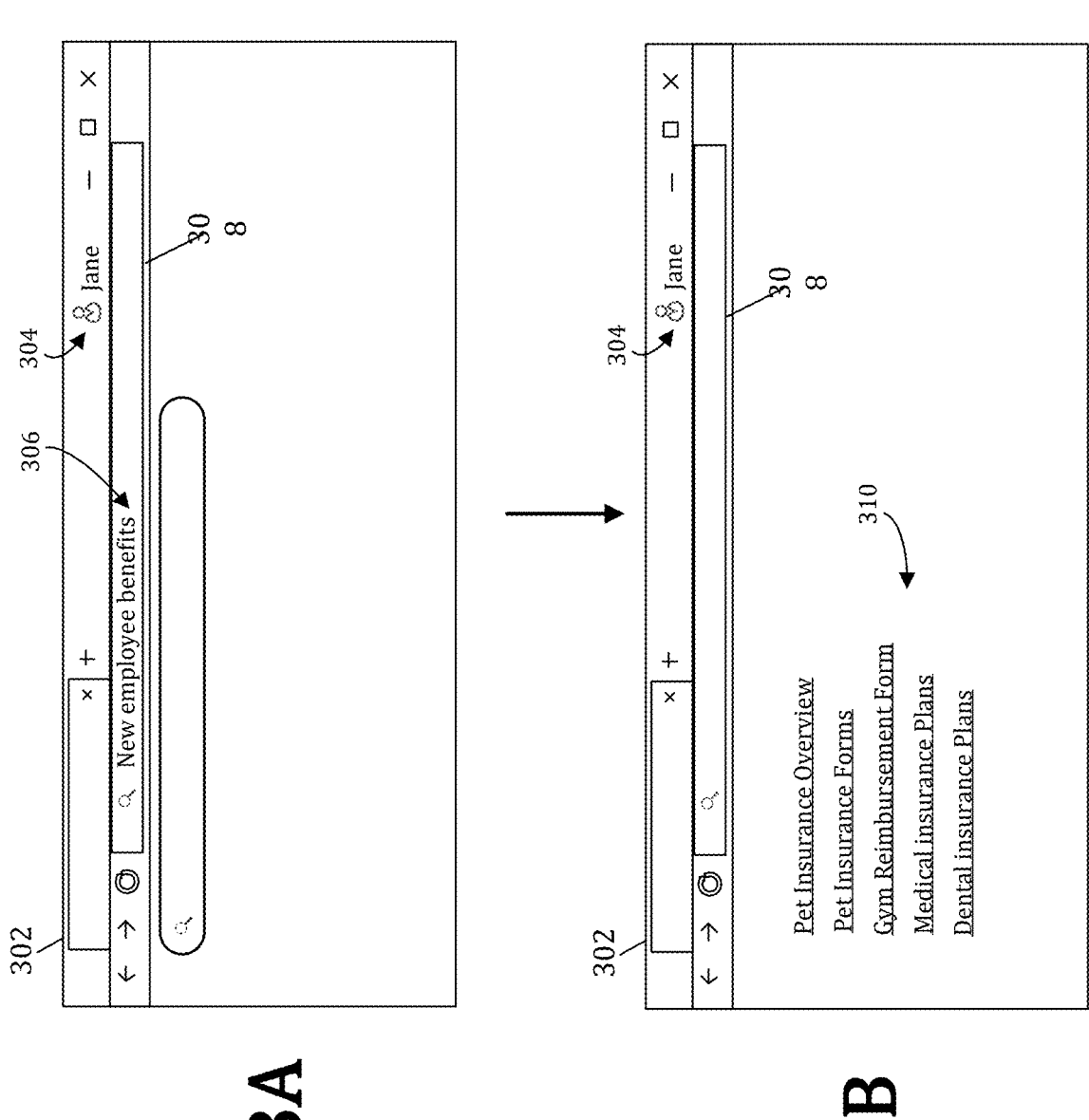
FIGS. 3A-3B depict an example of a query interface that provides personalized input suggestions.

FIGS. 3A-3B depict another example of a query interface that provides personalized input suggestions.

FIG. 3A depicts a web browser 302 that is configured to receive queries via query input field 308 and respond to such queries by executing a web search based on the query and surface the results of the web search. The results can include uniform resource locator (URL) links, text, images, or other forms of results.

In the example of FIG. 3A, the web browser 302 displays an indication of a user 304 of the web browser 302 and displays an input suggestion 306 ("new employee benefits") in the query input field 308. The input suggestion 306 is automatically generated and surfaced as described with reference to FIGS. 1, 2A, and 2B based on a user identifier associated with the user of the web browser 302 (in this example, a user identifier associated with the user "Jane"). For example, the web browser 302 requests an input suggestion and displays the input suggestion 306 when the web browser 302 is launched and/or in response to another trigger, as previously discussed.

The input suggestion 306 may be generated, for example, based on file information that indicates that another user with whom Jane is associated (e.g., a colleague) has recently added or edited files related to employee benefits and/or has hosted a meeting regarding employee benefits. It should be understood that, if a different user were using the web browser 302 (e.g., someone other than Jane), a different input suggestion may be generated (and surfaced) based on the user identifier of the different user.

In response to detecting a user input indicating a request to perform a web search based on the input suggestion 306, the web browser 302 executes a web search based on the input suggestion 306. The user input can include, for example, selecting an "enter" key or an equivalent icon while the input suggestion 306 is displayed in the query input field 308. In FIG. 3B, the web browser 302 surfaces the results 310 of the web search. In the example of FIG. 3B, the results 310 include five links to files or URLs associated with the input suggestion 306.

In the examples of FIGS. 2A-3B, the system generates personalized input suggestions for a user based on files that are predicted to be relevant to the user. In other examples, the system generates personalized input suggestions based on the user's search history, as described below with reference to FIGS. 4-6B.

In this case, the system aggregates previous search queries that the user has entered into a web browser or search engine and uses the previous queries to generate and surface personalized input suggestions in a chat interface. Such an approach enables a user to select an input suggestion in the chat interface to easily transition from web-based searches related to a particular topic to a chat session related to the same topic.

Figure 4A:
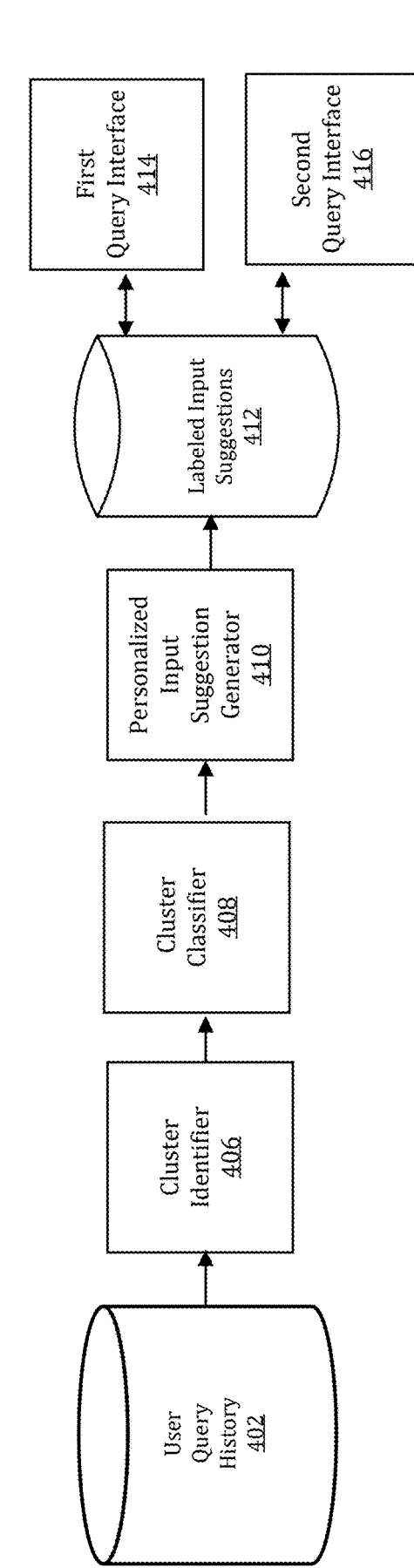
FIGS. 4A-4B depict block diagrams of example systems for generating personalized input suggestions for query interfaces.

FIG. 4A is a block diagram of a system 400 for generating personalized input suggestions for query interfaces in accordance with an example. As discussed with reference to system 100 of FIG. 1, the system 400, as depicted, is a combination of interdependent components that interact to form an integrated whole. Some components of the system are illustrative of software applications, systems, or modules that operate on a computing device or across a plurality of computer devices. Any suitable computer device(s) may be used, including web servers, application servers, network appliances, dedicated computer hardware devices, virtual server devices, personal computers, an SOC, or any combination of these and/or other computing devices known in the art. In one example, components of systems disclosed herein are implemented on a single processing device. The processing device may provide an operating environment for software components to execute and utilize resources or facilities of such a system. An example of processing device(s) comprising such an operating environment is depicted in FIG. 11. In another example, the components of systems disclosed herein are distributed across multiple processing devices. For instance, an input query or a personalized input suggestion may be displayed and/or entered on a user device or client device and information may be processed on or accessed from other devices in a network, such as one or more remote cloud devices or web server devices.

According to an aspect, the system 400 includes a user query history 402, which may be a file or database. The user query history 402 includes one or more queries (e.g., search strings) that have previously been entered, by a particular user, into a search field of a web browser (e.g., query input field 308 of web browser 302) or a search field of a search engine to cause the web browser or search engine to execute a web search. In some examples, the user query history 402 is aggregated, by the system 400, based on an identifier associated with the user. In some examples, the user query history 402 includes a timestamp associated with each query, and/or the queries in the user query history 402 are ordered based on an input order of the queries (e.g., an order in which the user entered the queries into the web browser or search engine).

The system includes a cluster identifier 406 that is configured to identify clusters (e.g., groups of one or more) of related queries in the user query history 402. In some examples, the cluster identifier 406 semantically analyzes queries in the user query history 402 to determine which queries are related to each other (e.g., which queries are directed to related topics) and group such related queries into a query cluster. Related queries need not be temporally adjacent to be included in the same query cluster; a user may have entered intervening unrelated queries. For example, a first query and a third query that are temporally separated by a second query may be determined, by the cluster identifier 406, to be related. In this case, the cluster identifier 406 may group the first query and the third query into a first query cluster and group the second query into a second (different) query cluster. In some examples, the cluster identifier 406 is implemented using an LLM, an AI model, and/or a machine-learning (ML) model. Clustering algorithms may be implemented to generate the clusters of queries, such as k-means clustering, Gaussian mixture, and/or other types of unsupervised ML algorithms for clustering data.

The cluster identifier 406 outputs, to a cluster classifier 408, the identified query cluster(s), including previous queries and, in some cases, an indication of the cluster to which each query belongs. The cluster classifier 408 is configured to classify each query cluster, such as by assigning a label (or labels) to each query cluster based on a semantic analysis of each query cluster. The cluster classifier 408 may be a machine-learning classifier that is trained to determine, based on a semantic analysis of each query cluster, which label(s) of a predetermined set of labels should be assigned to each query cluster.

In some examples, the query clusters and their corresponding labels are provided to a personalized input suggestion generator 410. The personalized input suggestion generator 410 may generate, for each query cluster, a prompt that includes the query cluster (e.g., that includes each query in the query cluster). The personalized input suggestion generator 410 may provide each such prompt to an AI model as an input, and receive an input suggestion as an output from the AI model in response. In this manner, the system 400 may generate one or more personalized input suggestions for a user based on one or more query clusters (e.g., based on the user's search history).

In some examples, input suggestions for a user are generated and updated as an ongoing background process. Additionally or alternatively, input suggestions may be generated and surfaced in response to a trigger, such as in response to receiving a request for input suggestions from a first query interface 414.

In some examples, each input suggestion that is generated based on a query cluster is saved with the label(s) assigned to the query cluster by the cluster classifier 408. For example, the system 400 saves the input suggestions and corresponding label(s) as labeled input suggestions 412 in a database or cache (e.g., in memory storage, such as a memory device).

In this case, in response to receiving a request for input suggestions from a first query interface 414 or a second query interface 416, the system 400 selects one or more input suggestions from the labeled input suggestions 412 and provides the selected input suggestion(s) to the query interface from which the request was received (i.e., the first query interface 414 or the second query interface 416).

In some examples, the system selects the input suggestions based on the label(s) associated with the input suggestions and/or based on the query interface from which the request was received. For example, if the first query interface 414 is a work-related query interface (e.g., it is connected to an internal company network), the system 400 may select an input suggestion(s) having a label of "work related." For example, if the second query interface 416 is not a work-related query interface (e.g., it is not connected to an internal company network), the system 400 may select an input suggestion(s) having a label of "non work related." For example, if the second query interface 416 is a school-related query interface (e.g., a query interface connected to a school-related network), the system 400 may selected an input suggestion(s) having a label of "school related," and so on.

In this manner, the system 400 provides input suggestions that are personalized to a particular user (by generating the input suggestions based on the user's search history) and are appropriate to the particular query interface with which the user is interacting (by providing different input suggestions depending on whether the user is interacting with a work-related query interface, a non-work-related query interface, a school-related query interface, etc.).

Figure 4B:
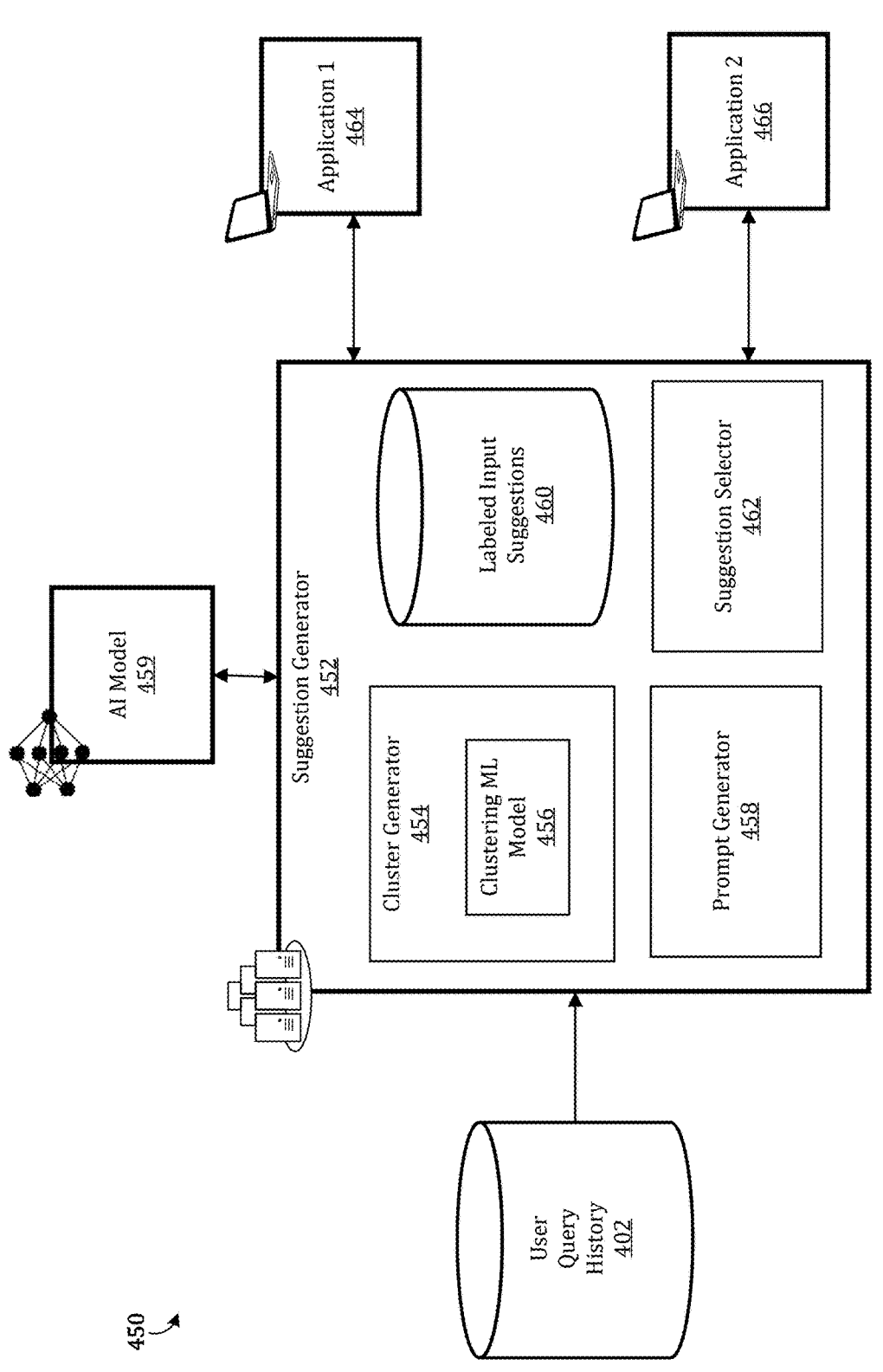

FIG. 4B is a block diagram of a system 450 for generating personalized input suggestions for query interfaces in accordance with another example. The system 450 similarly includes a user query history database 402 that stores prior web or search queries from a particular user. The prior queries are provided as input to a suggestion generator 452. The suggestion generator ultimately generates and surfaces input suggestions based on the prior queries.

A cluster generator 454 of the suggestion generator 452 clusters the prior queries into different query clusters. The clustering of the queries may be performed by a clustering ML model 456. The clustering ML model performs the clustering using a clustering algorithm (e.g., K-means). The clustering algorithm may rely on unsupervised ML techniques that allow for the different queries to be clustered together.

A prompt generator 458 then generates an AI prompt that includes one or more of the query clusters and static instructions that request an AI model 459 to generate an input suggestion and a classification label for the input suggestions based on the query cluster. The static instructions of the AI prompt may include specific categories for which the classification labels may be generated. For instance, the prompt may include a category list such as "Categories={Category 1, Category 2, Category 3}. As an example, the categories may be {Work Related, School Related, Non-Work Related}. The static instructions may also include example queries for each of the categories provided.

The AI prompt is then provided as input to the AI model 459, which may be any of the types of AI models discussed herein, such as a generative AI model. The AI model 459 processes the AI prompt and generates a responsive output. The output includes one or more input suggestions and a label, for each input suggestion, according to the classification categories set forth in the AI prompt. The labeled input suggestions are then stored in the labeled input suggestions database 460. Multiple AI prompts may be generated and processed to allow for labeled input suggestions to be generated for each of the query clusters.

One or more of the labeled input suggestions are then surfaced to a user based on the type of application being accessed by the user. For instance, the system 450 may include a first application 464 and a second application 466 (among other applications). The first application 464 has a first application type and the second application 466 has a second application type that is different from the first application. Both applications, however, may have a chat interface for interacting with an AI model, such as generative AI model. In examples, the interfaces for the first application 464 and the second application 466 are not interfaces for providing a web search query. Accordingly, the prior web search queries are leveraged to create suggestions for a non-web search application or interface.

The first application type corresponds to one or more of the label categories, and the second application type corresponds to one or more different label categories. Accordingly, the particular input suggestions that are surfaced to the user are based on the application type and the category label for the input suggestion. Such identification and selection of the labeled input suggestions may be performed by a suggestion selector 462.

As one example and continuing with the example categories above, the first application type may be a work-based application and the second application type may be a non-work-based application. In such an example, when a trigger is received from the first application 464 (e.g., when a chat interface is loaded and/or presented), one or more input suggestions having the "Work Related" label are selected by the suggestion selector 462 and provided to the first application 464 for surfacing in the first application 464. Similarly, when a trigger is received from the second application 466 (e.g., when a chat interface is loaded and/or presented), one or more input suggestions having the "Non-Work Related" category are selected by the suggestion selector 462 and provided to the second application 466 for surfacing in the second application 466.

Figure 5:
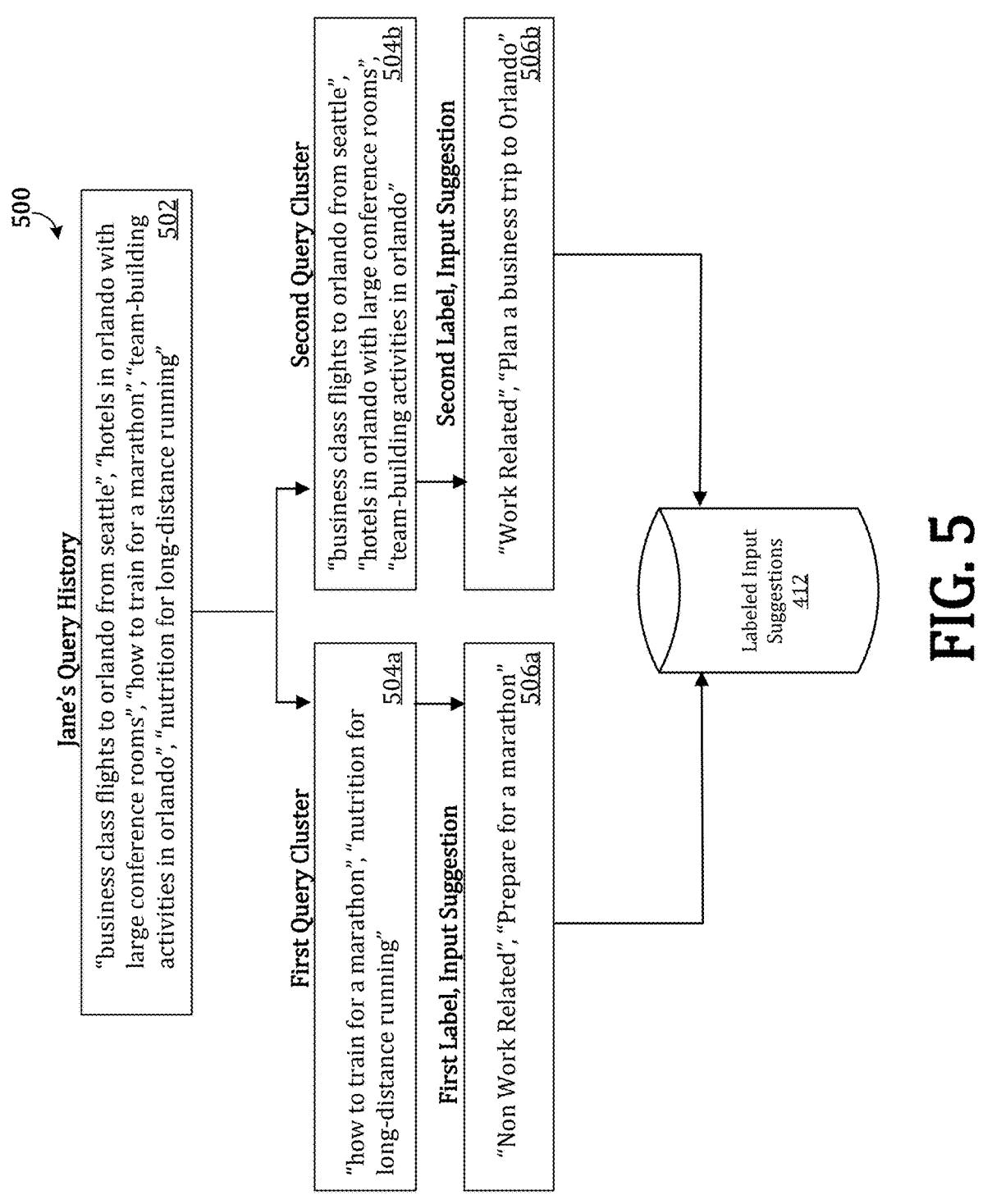
FIG. 5 depicts an example data flow for generating personalized input suggestions for a user based on the user's search history.

FIG. 5 depicts an example data flow 500 for generating personalized input suggestions for a user based on the user's search history. Data flow 500 depicts an example of processing a user's search history to identify query clusters and generate labeled input suggestions. In this example, the user query history 402 described with reference to FIGS. 4A-B includes a user's (Jane's) query history 502. The user's query history 502 includes five previous search queries (text strings) entered by the user (Jane), which are depicted in the order in which they were entered into a search interface (e.g., a web browser and/or a search engine). In some examples, a user's query history 502 may also include, for each previous search query, a timestamp associated with the query (not shown in FIG. 5). The search queries of the user's query history 502 are clustered into query clusters that include a first query cluster 504a and a second query cluster 504b. In other examples, the system may identify a single query cluster or more than two query clusters based on the user's query history.

Each query cluster includes a different subset of search queries from the user's query history 502. The first query cluster 504a is provided as input to an AI model (e.g., as part of a prompt, which may also include the first label). A first input suggestion is received as an output from the AI model. The first query cluster 504a and/or the first input suggestion is also classified with a first label of "non work related." The first label and first input suggestion 506a are saved in the labeled input suggestions 412. Similarly, the second query cluster 504b is provided as input to the AI model (e.g., as part of a prompt, which may also include the second label), and a second input suggestion is received as an output from the AI model. The second query cluster 504b and/or the second input suggestion is classified with a second label of "work related." The second label and second input suggestion 506b are saved in the labeled input suggestions 412. A chat interface can subsequently retrieve an input suggestion (s) from the labeled input suggestions 412 based on the label associated with the input suggestions, such as by retrieving input suggestions having a "work related" label or a "non work related" label, as described further herein.

Figures 6A, 6B:
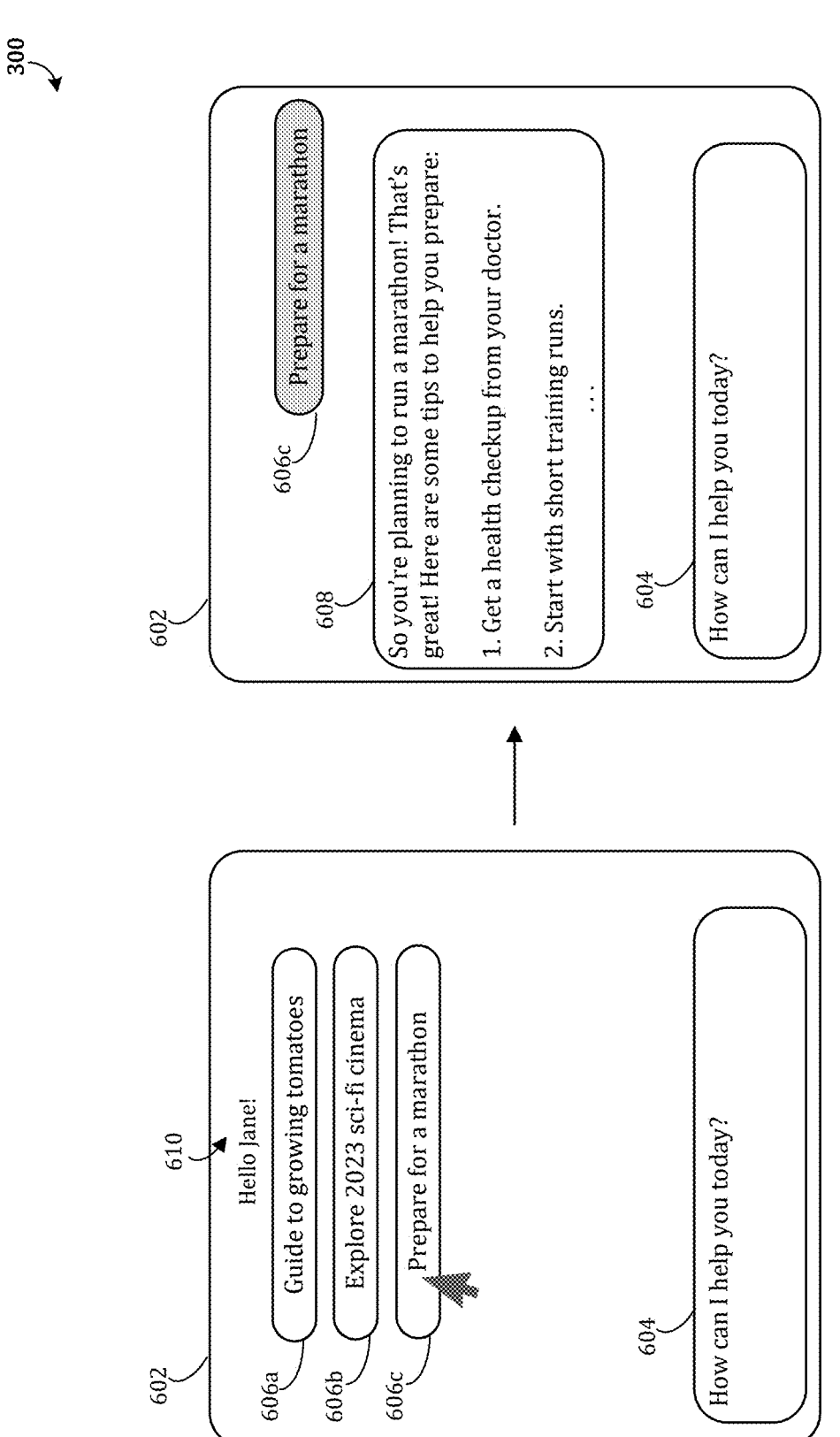
FIGS. 6A-6B depict an example of a chat interface that provides personalized input suggestions.

FIGS. 6A-6B depict an example of a chat interface that provides personalized input suggestions for a user based on a user's search history (e.g., previous queries the user has entered into a search interface, such as a web browser or search engine).

FIG. 6A depicts a first chatbot interface 602 for interacting with an AI model. The first chatbot interface 602 is configured to receive queries via text input field 604a and respond to such queries using an AI model, such as second AI model 114. For example, a user can input (e.g., type and enter) a text sentence in text input field 604. In the example of FIG. 6A, the first chatbot interface 602 displays an indication of a user 610 ("Jane") of the chatbot interface 602 and three personalized input suggestions: a first input suggestion 606a, a second input suggestion 606b, and a third input suggestion 606c. The user is associated with a user identifier as described with reference to FIG. 1.

In some examples, the first chatbot interface 602 obtains the three input suggestions 606 by requesting, from the labeled input suggestions described with reference to FIGS. 4A-B, input suggestions having a label that is associated with the first chatbot interface 602a and the user identifier. In the example of FIG. 6A, the first chatbot interface 602 is a personal chatbot interface associated with a label of "non work related." In this case, the first chatbot interface 602 receives, from the labeled input suggestions, input suggestions that have a label of "non work related" and are associated with the user identifier of the user (Jane). The input suggestions received from the labeled input suggestions include the first input suggestion 606a, second input suggestion 606b, and third input suggestion 606c. In response to receiving the input suggestions 606, the chatbot interface 602 concurrently displays the input suggestions 606 in the chatbot interface 602.

In response to detecting a user input indicating a selection of the third input suggestion 606c, the first chatbot interface 602 generates an AI prompt that includes the third input suggestion 606c, provides the prompt to an AI model as input, and receives a response as output from the AI model. The user input indicating a selection of the third input suggestion 606c can include, for example, a touch on a touch screen, a mouse click, voice input, and/or other user input directed to the third input suggestion 606c.

In FIG. 6B, in response to receiving the response 608 from the AI model, the first chatbot interface 602 surfaces the response 608. In the example of FIG. 6B, the first chatbot interface 602 also re-displays the selected third input suggestion 606c with different visual characteristics relative to those depicted in FIG. 6A (e.g., in a different location and with a different background color). In some examples, when the first chatbot interface 602 surfaces the response 608, the first chatbot interface 602 ceases to display unselected input suggestions (e.g., the first input suggestion 606a and the second input suggestion 606b).

Figures 7A, 7B:
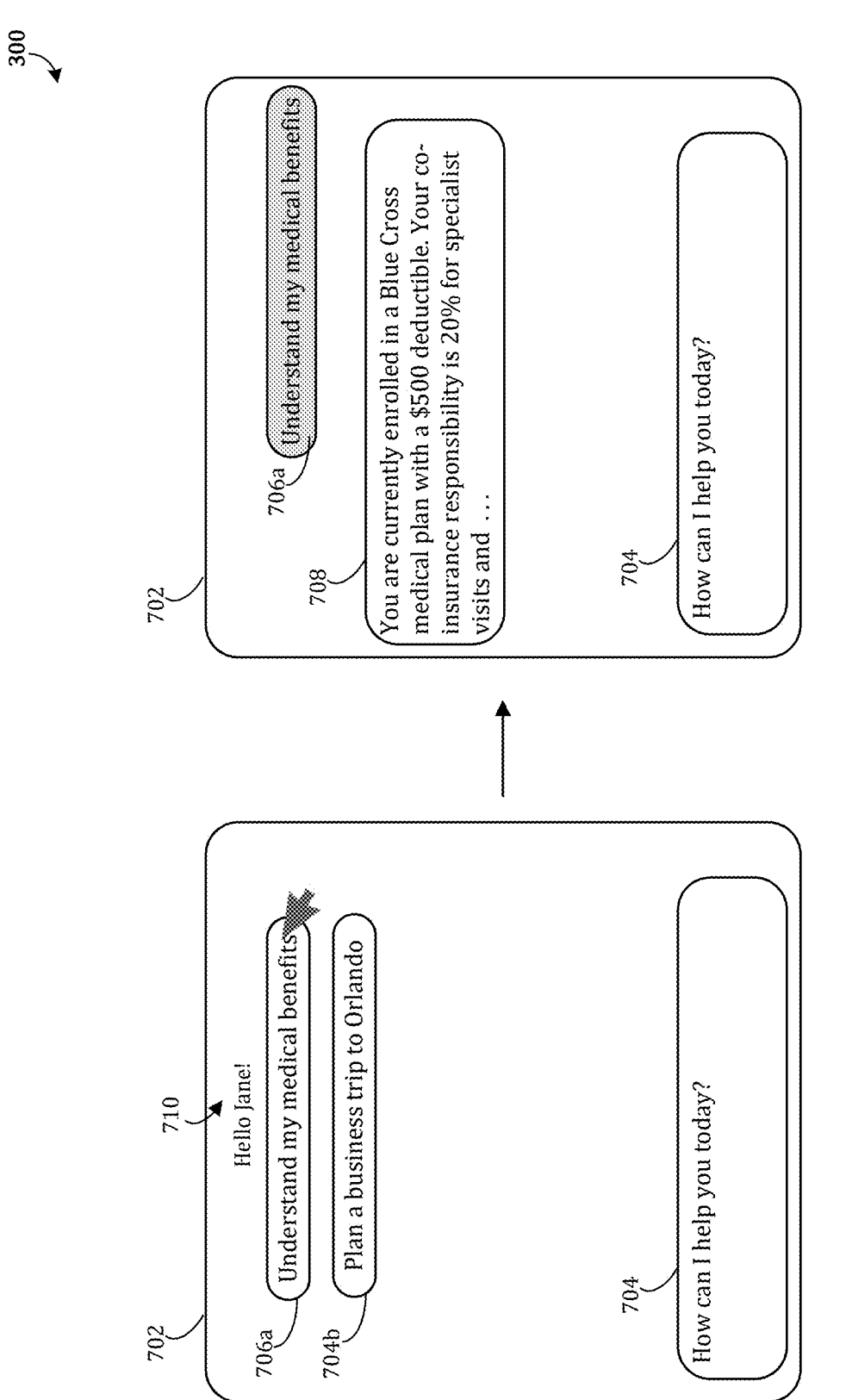
FIGS. 7A-7B depict an example of a chat interface that provides personalized input suggestions.

FIGS. 7A-7B depict another example of a chat interface that provides personalized input suggestions for a user based on a user's search history (e.g., previous queries the user has entered into a search interface, such as a web browser or search engine).

FIG. 7A depicts a second chatbot interface 702 for interacting with an AI model. The second chatbot interface 702 is configured to receive queries via text input field 704 and respond to such queries using an AI model, such as second AI model 114. In the example of FIG. 7A, the second chatbot interface 702 displays an indication of a user 710, which is the same user (Jane) as shown in FIG. 6A and is associated with the same user identifier. That is, the same user has launched and/or is interacting with the second chatbot interface 702 as was shown in the first chatbot interface 602. However, the second chatbot interface 702 is associated with a different label than the first chatbot interface 602 and therefore retrieves and surfaces different personalized input suggestions: a fourth input suggestion 706a and a fifth input suggestion 706b.

In some examples, the second chatbot interface 702 obtains the two input suggestions 706 by requesting, from the labeled input suggestions 412 described with reference to FIG. 4, input suggestions having a label that is associated with the second chatbot interface 702 and/or associated with the same user identifier as described with reference to FIG. 6A. In the example of FIG. 7A, the second chatbot interface 702 is a work chatbot interface that is connected to a work-related network and is therefore associated with a label of "work related." In this case, the second chatbot interface 702 requests and receives, from the labeled input suggestions 412, input suggestions that have a label of "work related" and are associated with the user identifier of the user (Jane). The input suggestions received from the labeled input suggestions 412 include the fourth input suggestion 706a and the fifth input suggestion 706b.

In response to detecting a user input indicating a selection of the fourth input suggestion 706a, the second chatbot interface 702 generates a prompt that includes the fourth input suggestion 706a, provides the prompt to an AI model as input, and receives a response as output from the AI model. In some examples, the AI model is connected to the work-related network and has access to work-related documents. The user input indicating a selection of the fourth input suggestion 706a can include, for example, a touch on a touch screen, a mouse click, or other user input directed to the fourth input suggestion 706a.

In FIG. 7B, in response to receiving the response 708 from the AI model, the second chatbot interface 702 surfaces the response 708, such as described with reference to FIG. 6B.

FIG. 8 depicts an example method 800 of providing personalized input suggestions in query interfaces. Method 800 is performed by a system such as system 100 or system 400.

At operation 802, the system selects, based on a first user identifier associated with a first user, a first set of files that are predicted to be relevant to the first user. In some examples, the first user identifier associated with the first user is an email address associated with the first user, a user ID, a username associated with the first user, an IP address associated with a computing device of the first user, or another type of identifier associated with the first user. The system may identify the first user identifier associated with the first user before selecting the first set of files, such as by identifying the first user identifier in response to detecting a new or previous login of the first user.

In some examples, the system selects the first set of files that are predicted to be relevant to the first user based on a recency of interaction with the respective file by the first user or by a second user that is associated with the first user, such as by selecting files having the most recent timestamps (e.g., the most recently accessed files). For example, the system may determine that the first user and/or a second user associated with the first user (such as a teammate, colleague, co-invitee of a meeting, or co-member of an email or chat group) has recently accessed the respective file by creating the file, editing the file, viewing the file, or otherwise accessing the file in a manner that causes a timestamp to be added to metadata associated with the file. The system may identify the set of files by identifying a quantity of files (e.g., 3, 5, 10, 20) that were most recently accessed by the first user and/or a second user associated with the first user.

In some examples, the system selects one or more files of the first set of files based on a temporal proximity (e.g., nearness in date/time to the current date/time) of a past or upcoming calendar event associated with the respective file, where the past or upcoming calendar event is associated with the first user (e.g., the first user is an invitee or host of the calendar event). For example, the system may select a file that is attached or otherwise associated with a recent past calendar event (e.g., an event that was scheduled to occur within the last 1, 5, 10, or 60 days) or a soon-upcoming calendar event (e.g., an event that is scheduled to occur within 1, 5, 10, or 60 days), such as a presentation file, a text document, a transcript, or an audio or video recording of the calendar event.

In some examples, the system selects one or more files of the first set of files based on a frequency of access of the respective file by the first user and/or the second user. For example, the system may select a file based on determining that the second user (and possibly other users associated with the first user) have frequently accessed the file, such as by accessing the file at least 2, 4, 6, or 10 times.

In some examples, the system selects one or more files of the first set of files based on a quantity of users associated with the first user that have accessed the respective file. For example, the system may select a file based on determining that multiple (e.g., at least 2, 3, 5, 10, or 100) other users associated with the first user have accessed the file, such as may occur when multiple teammates or colleagues of the user have accessed the file.

In some examples, the system selects one or more of the files of the first set of files based on a combination of one or more of the criteria described above. For example, the system may select a file that has been recently viewed by at least three users associated with the first user, and/or based on other combinations of criteria.

The files selected by the system may include files having different file types (e.g., files associated with and/or generated with different applications). For example, the system may select a text file, image file, calendar file, media file, or other types of files.

At operation 804, the system generates a first AI prompt (e.g., using a prompt generator 108) that includes, for each respective file in the set of files, at least one of a summary of the respective file or at least a portion of the respective file. In some examples, the system generates or retrieves the summary for each file selected at operation 802 and/or extracts the portion of each file selected at operation 802. In some examples, a summary of each file is pre-generated and stored by the file information aggregator 106. In this case, the system retrieves the summary from the file information aggregator when it selects the file for the first set of files.

At operation 806, the system provides (e.g., sends or transmits) the first prompt as input to a first AI model (e.g., first AI model 112). For example, the system provides the first prompt to the first AI model via a wired or wireless communication connection, such as a LAN or Internet connection. In other examples, the generation of the prompt and the execution of the AI model may occur on the same device.

At operation 808, the system receives, as output from the first AI model, a first input suggestion for interacting with a second AI model. For example, the system receives the first input suggestion from the first AI model via a wired or wireless communication connection, such as a LAN or Internet connection. In some examples, the system formats the received first input suggestion and provides the first input suggestion to an interface (e.g., a chatbot interface) for interacting with a second AI model (e.g., query interface 102 for interacting with second AI model 114). In some examples, the second AI model may be the same as the first AI model.

At operation 810, the system surfaces the first input suggestion in the interface for interacting with the second AI model, such as by displaying a first input suggestion 206*a*

(and in some cases, additional input suggestions received from the first AI model) in a chatbot interface 202 as depicted in FIG. 2A.

FIG. 9 depicts an example method 900 of providing personalized input suggestions in query interfaces. Method 900 is performed by a system such as system 100 or system 400.

At operation 902, the system clusters prior search queries associated with a first user into at least a first query cluster and a second query cluster. The first query cluster and second query cluster may each include one or more prior search queries that are semantically related to each other, such as search queries that are related to similar topics. In some examples, the prior search queries are search queries that were previously entered by the first user in a search interface (e.g., while the first user is logged in to the search interface), such as by typing and entering each query in a search field of a web browser or search engine. In some examples, the prior search queries for the first user are stored in a user search history file, such as user query history 402 described with reference to FIGS. 4A-B and retrieved by the system to generate personalized input suggestions (e.g., based on an identifier associated with the first user). In some examples, the system clusters the prior search queries using a cluster identifier, such as cluster identifier 406.

At operation 904, the system generates a first AI prompt that includes the first query cluster and a second AI prompt that includes the second query cluster. Each of the prompts instructs an AI model to generate content (such as a text string) for an input suggestion using the text of the query cluster. The AI prompt also includes static instructions for classifying the query clusters and/or generating input suggestions, as discussed above.

At operation 906, the system provides the first prompt and the second prompt as inputs to the first AI model. For example, the system provides the first prompt and second prompt to the first AI model via a wired or wireless communication connection, such as a LAN or Internet connection. In other examples, the prompt generation operations and AI model execution operations are performed on the same device.

At operation 908, the system receives, outputs from the first AI model. The outputs may include a first output associated with the first query cluster, the first output including a first input suggestion and a corresponding first classification, and a second output associated with the second query cluster, the second output including a second input suggestion and a corresponding second classification.

In other examples, rather than forming two AI prompts for the first query cluster and the second query cluster, a single AI prompt is generated that includes both the first query cluster and the second query cluster. In such examples, a single output may be received from the AI model that includes the labeled input suggestion(s) for the first query cluster and the labeled input suggestion(s) for the second query cluster.

At operation 910, the system selects the first input suggestion based on the first classification. In some examples, the system selects the first input suggestion in response to receiving a request for an input suggestion from a chat interface associated with the first classification.

At operation 912, the system surfaces the first input suggestion in a chat interface (e.g., the chat interface that requested the input suggestion, and/or with which the user is currently interacting or is logged into). In some examples, the chat interface is a chatbot interface for interacting with a second AI model.

FIG. 10 depicts an example method 1000 of providing personalized input suggestions in query interfaces. Method 1000 may be performed by a system such as system 100 or system 400.

At operation 1002, the system identifies a first user identifier associated with a first user of a chatbot interface for interacting with a first AI model (e.g., query interface 102, chatbot interface 202, first query interface 414, and/or second query interface 416). The system may identify the first user identifier by determining a user identifier of a user that is logged into the chatbot interface and/or logged into a computing device that is executing and/or presenting the chatbot interface, or by determining an IP address of the computing device, or in another manner.

At operation 1004, the system obtains, based on the first user identifier, text content associated with the first user. The system may obtain the text content by obtaining text content (e.g., summaries, metadata, and/or portions) of files that are predicted to be relevant to the first user (e.g., as described with reference to FIGS. 1-3 and 8). The system may obtain the text content by obtaining previous search queries (and/or query clusters) associated with the first user (e.g., as described with reference to FIGS. 4-7 and 9). In some examples, the system obtains the text content in response to detecting a trigger, such as by detecting a request for input suggestions from the chatbot interface, detecting that the chatbot interface has been launched, or detecting that the first user has logged into the chatbot interface.

At operation 1006, the system generates a first prompt that includes the text content, such as described with reference to operations 804 and/or 904. At operation 1008, the system provides the first prompt as input to a second AI model, such as described with reference to operations 806 and/or 906.

At operation 1010, the system receives, as output from the second AI model, a first input suggestion for interacting with the first AI model, such as described with reference to operations 808 and/or 908. At operation 1012, the system surfaces the first input suggestion in the chatbot interface, such as described with reference to operations 810 and/or 912. The above methods (e.g., methods 800, 900, 1000) may be combined with one another as well.

FIG. 11 is a block diagram illustrating physical components (e.g., hardware) of a computing device 1100 with which examples of the present disclosure may be practiced. The computing device components described below may be suitable for one or more of the components of the systems described above. In a basic configuration, the computing device 1100 includes at least one processing unit 1102 and a system memory 1104. Depending on the configuration and type of computing device 1100, the system memory 1104 may comprise volatile storage (e.g., random access memory), non-volatile storage (e.g., read-only memory), flash memory, or any combination of such memories. The system memory 1104 may include an operating system 1105 and one or more program modules 1106 suitable for running software applications 1150 (e.g., chat interfaces, web browsers, search engines, an input suggestion manager, a file information aggregator, a prompt generator, one or more AI models, a cluster identifier, a cluster classifier, and/or a personalized input suggestion generator) and/or other applications.

The operating system 1105 may be suitable for controlling the operation of the computing device 1100. Furthermore, aspects of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, or optical disks. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 may perform processes including one or more of the stages of the methods 800, 900, and/or 1000, illustrated in FIGS. 8-10. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via an SOC where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. Examples of the present disclosure may also be practiced using other technologies capable of performing logical operations such as, for example, AND, OR, and NOT, including mechanical, optical, fluidic, and quantum technologies.

The computing device 1100 may also have one or more input device(s) 1112 such as a keyboard, a mouse, a pen, a sound input device, a touch input device, a camera, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include RF transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 1104, the removable storage device 1109, and the non-removable storage device 1110 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer readable media may be part of the computing device 1100. Computer readable media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

In an aspect, the technology relates to a system for generating personalized input suggestions. The system includes at least one processor; and memory storing instructions that, when executed by the at least one processor, cause the system to perform operations. The operations include selecting, based on a first user identifier associated with a first user, a first set of files that are predicted to be relevant to the first user; generating a first prompt that includes, for each respective file in the first set of files, at least one of a summary of the respective file or at least a portion of the respective file; providing the first prompt as input to a first artificial intelligence (AI) model; receiving, as output from the first AI model, a first input suggestion for interacting with a second AI model; and surfacing the first input suggestion in an interface for interacting with the second AI model.

In an example, the operations further include detecting a user input corresponding to a selection of the first input suggestion; in response to detecting the user input, generating a second prompt that includes the first input suggestion; providing the second prompt as input to the second AI model; receiving, as output from the second AI model, a first response; and surfacing the first response in the interface for interacting with the second AI model. In another example, each respective file of the first set of files is selected based on at least one of: a recency of interaction with the respective file by the first user or by a second user that is associated with the first user, a temporal proximity of an upcoming or past event associated with the respective file, wherein the upcoming or past event is associated with the first user; a frequency of access of the respective file by the first user or by the second user; or a quantity of users associated with the first user that have accessed the respective file. In yet another example, the first set of files comprises a first file having a first file type and a second file having a second file type different from the first file type. In still another example, selecting the first set of files includes selecting each respective file of the first set of files based on a respective summary of the respective file. In still yet another example, the operations further include detecting a trigger associated with the interface for interacting with the second AI model, wherein the first set of files is selected in response to detecting the trigger.

In another example, the operations further include before surfacing the first input suggestion, storing the first input suggestion in a memory device; detecting a trigger associated with the interface for interacting with the second AI model; and in response to detecting the trigger, retrieving the first input suggestion from the memory device, wherein the first input suggestion is surfaced in response to the detection of the trigger. In yet another example, the operations further include receiving, as second output from the first AI model, a second input suggestion for interacting with the second AI model; and surfacing the second input suggestion in the interface for interacting with the second AI model, wherein the second input suggestion is surfaced concurrently with the first input suggestion. In still another example, the second AI model is the same as the first AI model.

In another aspect, the technology relates to a system for generating personalized input suggestions. The system includes at least one processor; and memory storing instructions that, when executed by the at least one processor, cause the system to perform operations. The operations include clustering prior search queries associated with a user into at least a first query cluster and a second query cluster; generating a first prompt that includes the first query cluster and a second prompt that includes the second query cluster; providing the first prompt and the second prompt as inputs to a first artificial intelligence (AI) model; receiving, as outputs from the first AI model: a first output associated with the first query cluster, the first output comprising a first input suggestion and a first classification associated with the first input suggestion, and a second output associated with the second query cluster, the second output comprising a second input suggestion and a second classification associated with the second input suggestion. The operations further include selecting the first input suggestion based on the first classification; and surfacing the first input suggestion in a first chat interface for interacting with a second AI model.

In an example, the operations further include detecting a user input corresponding to a selection of the first input suggestion; in response to detecting the user input, generating a third prompt that includes the first input suggestion; providing the third prompt as input to the second AI model; receiving, as output from the second AI model, a response; and surfacing the response in the first chat interface. In another example, the first input suggestion is surfaced while the user is logged in to the first chat interface. In still another example, the operations further include detecting a first trigger associated with a first chat interface while the user is logged in to the first chat interface, wherein the first input suggestion is selected and surfaced in response to detecting the first trigger. In a further example, the operations further include detecting a second trigger associated with a second chat interface while the user is logged in to the second chat interface, wherein the second chat interface is associated with the second classification; and in response to detecting the second trigger: selecting the second input suggestion based on the second classification; and surfacing the second input suggestion in a second chat interface for interacting with a third AI model.

In another aspect, the technology relates to a computer-implemented method for generating personalized input suggestions. The computer-implemented method includes identifying a user identifier associated with a user of a chatbot interface for interacting with a first artificial intelligence (AI) model; obtaining, based on the user identifier, text content associated with the user, wherein the text content incudes at least one of files relevant to the user or prior web search queries of the user; generating a first prompt that includes the text content; providing the first prompt as input to a second AI model; receiving, as output from the second AI model, a first input suggestion for interacting with the first AI model; and surfacing the first input suggestion in the chatbot interface.

In an example, the method further includes detecting a user input corresponding to a selection of the first input suggestion; in response to detecting the user input, generating a second prompt that includes the first input suggestion; providing the second prompt as input to the first AI model; receiving, as output from the first AI model, a first response; and surfacing the first response in the chatbot interface. In another example, obtaining the text content comprises obtaining the prior web search queries of the user. In still another example, obtaining the text content comprises obtaining files relevant to the user. In yet another example, the method further includes detecting a trigger associated with the chatbot interface, wherein the text content is obtained in response to detecting the trigger. In still yet another example, detecting the trigger comprises detecting at least one of the chatbot interface being launched or the user logging into the chatbot interface.

It is to be understood that the methods, modules, and components depicted herein are merely examples. Alternatively, or in addition, the functionality described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Illustrative non-transitory media include non-volatile media and/or volatile media. Non-volatile media include, for example, a hard disk, a solid-state drive, a magnetic disk or tape, an optical disk or tape, a flash memory, an erasable programmable read-only memory (EPROM), non-volatile random-access memory (NVRAM), phase-change random-access memory (PRAM), or other such media, or networked versions of such media. Volatile media include, for example, dynamic memory such as dynamic random-access memory (DRAM), static random-access memory (SRAM), a cache, or other such media. Non-transitory media is distinct from, but can be used in conjunction with, transmission media. Transmission media is used for transferring data and/or instruction to or from a machine. Examples of transmission media include coaxial cables, fiber-optic cables, copper wires, and wireless media, such as radio waves.

Furthermore, those skilled in the art will recognize that boundaries between the functionality of the above-described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for generating personalized input suggestions, comprising:
    at least one processor; and
    memory storing instructions that, when executed by the at least one processor, cause the system to perform operations comprising:
        selecting, based on a first user identifier associated with a first user, a first set of files that are predicted to be relevant to the first user;
        generating a first prompt that includes, for each respective file in the first set of files, at least one of a summary of the respective file or at least a portion of the respective file;
        providing the first prompt as input to a first artificial intelligence (AI) model;
        receiving, as output from the first AI model, a first input suggestion for interacting with a second AI model; and
        surfacing the first input suggestion in an interface for interacting with the second AI model.

2. The system of claim 1, wherein the operations further comprise:
    detecting a user input corresponding to a selection of the first input suggestion;
    in response to detecting the user input, generating a second prompt that includes the first input suggestion;
    providing the second prompt as input to the second AI model;
    receiving, as output from the second AI model, a first response; and
    surfacing the first response in the interface for interacting with the second AI model.

3. The system of claim 1, wherein each respective file of the first set of files is selected based on at least one of:

a recency of interaction with the respective file by the first user or by a second user that is associated with the first user, a temporal proximity of an upcoming or past event associated with the respective file, wherein the upcoming or past event is associated with the first user;

a frequency of access of the respective file by the first user or by the second user; or a quantity of users associated with the first user that have accessed the respective file.

4. The system of claim 1, wherein the first set of files comprises a first file having a first file type and a second file having a second file type different from the first file type.

5. The system of claim 1, wherein selecting the first set of files comprises selecting each respective file of the first set of files based on a respective summary of the respective file.

6. The system of claim 1, wherein the operations further comprise:

detecting a trigger associated with the interface for interacting with the second AI model, wherein the first set of files is selected in response to detecting the trigger.

7. The system of claim 1, wherein the operations further comprise:

before surfacing the first input suggestion, storing the first input suggestion in a memory device;

detecting a trigger associated with the interface for interacting with the second AI model; and in response to detecting the trigger, retrieving the first input suggestion from the memory device, wherein the first input suggestion is surfaced in response to the detection of the trigger.

8. The system of claim 1, wherein the operations further comprise:

receiving, as second output from the first AI model, a second input suggestion for interacting with the second AI model; and surfacing the second input suggestion in the interface for interacting with the second AI model, wherein the second input suggestion is surfaced concurrently with the first input suggestion.

9. The system of claim 1, wherein the second AI model is the same as the first AI model.

10. A system for generating personalized input suggestions, comprising:

at least one processor; and memory storing instructions that, when executed by the at least one processor, cause the system to perform operations comprising:

clustering prior search queries associated with a user into at least a first query cluster and a second query cluster;

generating a first prompt that includes the first query cluster and a second prompt that includes the second query cluster;

providing the first prompt and the second prompt as inputs to a first artificial intelligence (AI) model;

receiving, as outputs from the first AI model:

a first output associated with the first query cluster, the first output comprising a first input suggestion and a first classification associated with the first input suggestion, and a second output associated with the second query cluster, the second output comprising a second input suggestion and a second classification associated with the second input suggestion;

selecting the first input suggestion based on the first classification; and surfacing the first input suggestion in a first chat interface for interacting with a second AI model.

11. The system of claim 10, wherein the operations further comprise:

detecting a user input corresponding to a selection of the first input suggestion;

in response to detecting the user input, generating a third prompt that includes the first input suggestion;

providing the third prompt as input to the second AI model;

receiving, as output from the second AI model, a response; and surfacing the response in the first chat interface.

12. The system of claim 10, wherein the first input suggestion is surfaced while the user is logged in to the first chat interface.

13. The system of claim 10, wherein the operations further comprise:

detecting a first trigger associated with a first chat interface while the user is logged in to the first chat interface, wherein the first input suggestion is selected and surfaced in response to detecting the first trigger.

14. The system of claim 13, wherein the operations further comprise:

detecting a second trigger associated with a second chat interface while the user is logged in to the second chat interface, wherein the second chat interface is associated with the second classification;

in response to detecting the second trigger:

selecting the second input suggestion based on the second classification; and surfacing the second input suggestion in a second chat interface for interacting with a third AI model.

15. A computer-implemented method for generating personalized input suggestions, comprising:

identifying a user identifier associated with a user of a chatbot interface for interacting with a first artificial intelligence (AI) model;

obtaining, based on the user identifier, text content associated with the user, wherein the text content includes at least one of files relevant to the user or prior web search queries of the user;

generating a first prompt that includes the text content;

providing the first prompt as input to a second AI model;

receiving, as output from the second AI model, a first input suggestion for interacting with the first AI model; and surfacing the first input suggestion in the chatbot interface.

16. The method of claim 15, further comprising:

detecting a user input corresponding to a selection of the first input suggestion;

in response to detecting the user input, generating a second prompt that includes the first input suggestion;

providing the second prompt as input to the first AI model;

receiving, as output from the first AI model, a first response; and surfacing the first response in the chatbot interface.

17. The method of claim 15, wherein obtaining the text content comprises obtaining the prior web search queries of the user.

18. The method of claim 15, wherein obtaining the text content comprises obtaining files relevant to the user.

19. The method of claim 15, further comprising:

detecting a trigger associated with the chatbot interface, wherein the text content is obtained in response to detecting the trigger.

20. The method of claim 19, wherein detecting the trigger comprises detecting at least one of the chatbot interface being launched or the user logging into the chatbot interface.

\* \* \* \* \*